United States Patent
Lee et al.

(10) Patent No.: US 11,082,994 B2
(45) Date of Patent: Aug. 3, 2021

(54) METHOD FOR V2X COMMUNICATION PERFORMED BY MEANS OF TERMINAL IN WIRELESS COMMUNICATION SYSTEM AND TERMINAL USING SAME

(71) Applicant: LG ELECTRONICS INC., Seoul (KR)

(72) Inventors: Seungmin Lee, Seoul (KR); Suckchel Yang, Seoul (KR); Hanbyul Seo, Seoul (KR); Daesung Hwang, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 16/090,571

(22) PCT Filed: Apr. 3, 2017

(86) PCT No.: PCT/KR2017/003659
§ 371 (c)(1),
(2) Date: Oct. 1, 2018

(87) PCT Pub. No.: WO2017/171528
PCT Pub. Date: Oct. 5, 2017

(65) Prior Publication Data
US 2020/0404684 A1 Dec. 24, 2020

Related U.S. Application Data

(60) Provisional application No. 62/317,400, filed on Apr. 1, 2016, provisional application No. 62/331,427, filed
(Continued)

(51) Int. Cl.
*H04W 72/12* (2009.01)
*H04W 4/40* (2018.01)
(Continued)

(52) U.S. Cl.
CPC ....... *H04W 72/1257* (2013.01); *H04L 5/0055* (2013.01); *H04W 4/40* (2018.02); *H04W 72/1247* (2013.01); *H04W 92/18* (2013.01)

(58) Field of Classification Search
CPC ...... H04L 5/0053; H04L 5/0055; H04W 4/40; H04W 16/14; H04W 72/02; H04W 72/04;
(Continued)

(56) References Cited

U.S. PATENT DOCUMENTS 9,807,810 B2 * 10/2017 Lu .............. H04W 72/082
10,212,711 B2 * 2/2019 Lee .............. H04W 52/383
(Continued)

FOREIGN PATENT DOCUMENTS

KR 20100102686 9/2010
WO 2013191360 12/2013
(Continued)

OTHER PUBLICATIONS

LG Electronics, Multiplexing of Uu and D2D communication, Feb. 10, 2014, 3GPP, 3GPP TSG RAN WG1 Meeting #76, Tdoc: R1-140335 (Year: 2014).*
(Continued)

*Primary Examiner* — Eric Nowlin
(74) *Attorney, Agent, or Firm* — Lee Hong Degerman Kang Waimey

(57) ABSTRACT

The present invention relates to a method for V2X (vehicle-to-everything) communication performed by means of a terminal in a wireless communication system, the method characterized by: determining whether or not the transmission points of feedback information for sidelink semi-persistent scheduling (SPS) information and feedback information for a wide area network (WAN) physical downlink shared channel (PDSCH) overlap; and transmitting the feedback information for the sidelink SPS information and the
(Continued)

feedback information for the WAN PDSCH on the basis of the determination, wherein, if the transmission points of the feedback information for the sidelink SPS information and the feedback information for the WAN PDSCH overlap, the feedback information for the sidelink SPS information and the feedback information for the WAN PDSCH are transmitted by means of multiplexing or transmitted on the basis of priority.

9 Claims, 18 Drawing Sheets

Related U.S. Application Data on May 3, 2016, provisional application No. 62/333,838, filed on May 10, 2016.

(51) Int. Cl.
*H04L 5/00* (2006.01)
*H04W 92/18* (2009.01)

(58) Field of Classification Search
CPC ......... H04W 72/0406; H04W 72/0446; H04W 72/10; H04W 72/12; H04W 72/1242; H04W 72/1247; H04W 72/1263
See application file for complete search history.

(56) References Cited

U.S. PATENT DOCUMENTS

| | | | | |
|---|---|---|---|---|
| 10,334,606 | B2* | 6/2019 | Lu | H04W 72/082 |
| 10,536,987 | B2* | 1/2020 | Siomina | H04W 76/14 |
| 10,834,747 | B2* | 11/2020 | Lu | H04W 72/02 |
| 10,873,933 | B2* | 12/2020 | Liu | H04L 1/0025 |
| 2013/0195065 | A1* | 8/2013 | Park | H04L 5/0055 |
| | | | | 370/329 |
| 2015/0043446 | A1* | 2/2015 | Tsirtsis | H04W 72/1242 |
| | | | | 370/329 |
| 2015/0098422 | A1* | 4/2015 | Sartori | H04W 72/1242 |
| | | | | 370/329 |
| 2015/0319796 | A1* | 11/2015 | Lu | H04B 7/2615 |
| | | | | 370/330 |
| 2016/0037567 | A1* | 2/2016 | Lei | H04L 1/1671 |
| | | | | 370/329 |
| 2017/0245282 | A1* | 8/2017 | Lee | H04W 72/0473 |
| 2018/0014344 | A1* | 1/2018 | Lu | H04L 5/06 |
| 2020/0045724 | A1* | 2/2020 | Lu | H04W 72/14 |
| 2020/0112982 | A1* | 4/2020 | Li | H04L 5/0082 |
| 2020/0404684 | A1* | 12/2020 | Lee | H04W 4/40 |

FOREIGN PATENT DOCUMENTS

| | | | | |
|---|---|---|---|---|
| WO | WO-2015023360 A1 * | 2/2015 | ........ | H04W 72/1242 |
| WO | 2016021962 | 2/2016 | | |
| WO | WO-2017171528 A1 * | 10/2017 | ............ | H04W 72/12 |

OTHER PUBLICATIONS

LG Electronics, Multiplexing of Uu and D2D discovery signal, Feb. 10, 2014, 3GPP, 3GPP TSG RAN WG1 Meeting #76, Tdoc: R1-140338 (Year: 2014).*
Samsung, Discussion on D2D and cellular communication multiplexing, Feb. 10, 2014, 3GPP, 3GPP TSG RAN WG1 Meeting #76, Tdoc: R1-140391 (Year: 2014).*
Samsung, Multiplexing between WAN and D2D from system perspective, Feb. 10, 2014, 3GPP, 3GPP TSG RAN WG1 Meeting #76, Tdoc: R1-140394 (Year: 2014).*
NEC, Considerations of subframe design for D2D and cellular resource multiplexing, Feb. 10, 2014, 3GPP, 3GPP TSG RAN WG1 Meeting #76, Tdoc: R1-140490 (Year: 2014).*
NEC, Discussion on Multiplexing D2D link and Cellular link, Feb. 10, 2014, 3GPP, 3GPP TSG RAN WG1 Meeting #76, Tdoc: R1-140491 (Year: 2014).*
CATT, On Prioritization of SL TX for V2X under eNB management, Oct. 10, 2016, 3GPP, 3GPP TSG RAN WG1 Meeting #86bis, Tdoc: R1-1608723 (Year: 2014).*
LG Electronics, Discussion on prioritizing SL TX over WAN TX, Oct. 10, 2016, 3GPP, 3GPP TSG RAN WG1 Meeting #86bis, Tdoc: R1-1609192 (Year: 2014).*
Nokia et al., On Prioritization of V2V Sidelink TX over WAN UL TX, Oct. 10, 2016, 3GPP, 3GPP TSG RAN WG1 Meeting #86bis, Tdoc: R1-1609790 (Year: 2016).*
NTT Docomo, Inc., Discussion on eNB management of prioritizing V2x SL Tx over WAN Tx, Oct. 10, 2016, 3GPP, 3GPP TSG RAN WG1 Meeting #86bis, Tdoc: R1-1610036 (Year: 2016).*
LG Electronics et al., WF on prioritization of SL TX over UL TX, Oct. 10, 2016, 3GPP, 3GPP TSG RAN WG1 Meeting #86bis, Tdoc: R1-1610709 (Year: 2016).*
NTT Docomo et al., Way Forward on Prioritizing V2X SL TX over WAN Tx, Oct. 10, 2016, 3GPP, 3GPP TSG RAN WG1 Meeting #86bis, Tdoc: R1-1610973 (Year: 2016).*
PCT International Application No. PCT/KR2017/003659, International Search Report dated Jul. 5, 2017, 4 pages.
LG Electronics, "Summary of V2V offline summary," R1-161405, Feb. 2016, 4 pages.

* cited by examiner

METHOD FOR V2X COMMUNICATION PERFORMED BY MEANS OF TERMINAL IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2017/003659, filed on Apr. 3, 2017, which claims the benefit of U.S. Provisional Application No. 62/317,400, filed on Apr. 1, 2016, 62/331,427, filed on May 3, 2016, and 62/333,838, filed on May 10, 2016, the contents of which are all hereby incorporated by reference herein in their entireties.

BACKGROUND OF THE INVENTION

Field of the Invention

The present invention relates to wireless communications and more particularly to a V2X communication method performed by a terminal in a wireless communication system and a terminal using the same.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, there has been a growing interest in D2D (Device-to-Device) technology for direct communication between devices. In particular, D2D is attracting attention as a communication technology for the public safety network. Commercial communication networks are rapidly changing to LTE, but current public safety networks are mainly based on 2G technology in terms of conflicts with existing communication standards and cost. These technological gaps and demands for improved services have led to efforts to improve public safety networks.

Public safety networks have higher service requirements (reliability and security) than commercial communication networks and require direct signal transmission and reception, or D2D operation, between devices, especially when the coverage of cellular communications is insufficient or unavailable.

For example, D2D operation in general can have a variety of advantages in that it transmits and receives signals between nearby devices. For example, the D2D UE has high data rate and low delay and is capable of data communication. Also, the D2D operation can disperse the traffic to the base station, and can also expand the coverage of the base station if the UE performing the D2D operation acts as a repeater.

The D2D communication may expand and be applicable for signal transmission and reception between vehicles, and vehicle-related communication is referred to as Vehicle-To-Everything (V2X) communication.

The term "x" in V2X means pedestrian (communication between a vehicle and a device carried by an individual (e.g.,) handheld terminal carried by a pedestrian, cyclist, driver or passenger)) (V2P), vehicle (communication between vehicles) (V2V), infrastructure/network (communication between a vehicle and a roadside unit (RSU)/network (e.g.,) RSU is a transportation infrastructure entity (e.g.,) an entity transmitting speed notifications) implemented in an eNB or a stationary UE)) (V2I/N)

Sidelink (or uplink) semi-persistent scheduling (SPS) or a WAN (UNICAST) PDSCH may be signaled (or set) to a V2X terminal. In this case, the terminal may transmit feedback (or control) information on the sidelink SPS and feedback (or control) information on the WAN PDSCH, and a transmission time of the feedback (or control) information on the sidelink SPS and a transmission time of the feedback (or control) information on the WAN PDSCH may partially or entirely overlap. If the transmission time of the feedback (or control) information on the sidelink SPS and the transmission time of the feedback (or control) information on the WAN PDSCH partially or entirely overlap, the question lies in how the V2X terminal multiplexes the feedback (or control) information on the sidelink SPS and the feedback (or control) information on the WAN PDSCH and transmits the multiplexed information or which one of the feedback (or control) information on the sidelink SPS and the feedback (or control) information on the WAN PDSCH the V2X terminal transmits first.

Regarding this, there is described a method in which the V2X terminal efficiently transmits the feedback (or control) information on the sidelink SPS and the feedback (or control) information on the WAN PDSCH when the transmission time of the feedback (or control) information on the sidelink SPS and the transmission time of the feedback (or control) information on the WAN PDSCH partially or entirely overlap with each other, and a terminal using the method.

SUMMARY OF THE INVENTION

The present invention provides a V2X communication method performed by a terminal in a wireless communication system, and a terminal using the same.

In an aspect, a method for Vehicle-To-Everything (V2X) communication in a wireless communication system is provided. The method may be performed by a user equipment (UE) and comprise determining whether or not a transmission time of feedback information on sidelink Semi Persistent Scheduling (SPS) information and a transmission time of feedback information on a Wide Area Network (WAN) Physical Downlink Shared Channel (PDSCH) overlap, and transmitting the feedback information on the sidelink SPS information and the feedback information on the WAN PDSCH based on the determination. When the transmission time of the feedback information on the sidelink SPS information and the transmission time of the feedback information on the WAN PDSCH overlap, the feedback information on the sidelink SPS information and the feedback information on the WAN PDSCH may be transmitted by means of multiplexing or on the basis of a priority order.

The feedback information on the sidelink SPS information may be acknowledgement (ACK)/negative acknowledgement (NACK) information on a sidelink SPS message, or a transmission indicator indicative of intention to transmit data.

The feedback information on the WAN PDSCH may be acknowledgement (ACK)/negative acknowledgement (NACK) information on the WAN PDSCH.

When the feedback information on the sidelink SPS information and the feedback information on the WAN PDSCH are transmitted by means of multiplexing, an amount of the feedback information on the WAN PDSCH may be transmitted compared to an amount of the feedback information on the sidelink SPS information.

One PUCCH resource of the feedback information on the sidelink SPS information may be allocated, and two PUCCH resources of the feedback information on the WAN PDSCH are allocated.

When the feedback information on the sidelink SPS information and the feedback information on the WAN PDSCH are transmitted by means of multiplexing, the feedback information on the sidelink SPS information and the feedback information on the WAN PDSCH may be multiplexed based on a acknowledgement (ACK)/negative acknowledgement (NACK) channel selection table.

When the feedback information on the sidelink SPS information and the feedback information on the WAN PDSCH are transmitted by means of multiplexing: the feedback information on the sidelink SPS information and the feedback information on the WAN PDSCH may be multiplexed based on an acknowledgement (ACK)/negative acknowledgement (NACK) channel selection table in a case where a Downlink Assignment Index (DAI) value received by the UE is equal to or smaller than a preset value, and the feedback information on the sidelink SPS information and the feedback information on the WAN PDSCH may be multiplexed based on Physical Uplink Control Channel (PUCCH) format 3 in a case where the DAI value received by the UE is greater than the preset value.

The feedback information on the sidelink SPS information and the feedback information on the WAN PDSCH may be prioritized, and when the feedback information on the sidelink SPS information and the feedback information on the WAN PDSCH are transmitted on the basis of a priority order, transmission of feedback information of a relatively low priority level may be omitted.

When a priority level for the feedback information on the sidelink SPS information is lower than a priority level for the feedback information on the WAN PDSCH, transmission of the feedback information on the sidelink SPS information may be omitted.

When a priority level for the feedback information on the WAN PDSCH is lower than a priority level for the feedback information on the sidelink SPS information, transmission of the feedback information on the the WAN PDSCH may be omitted.

In another aspect, a user equipment (UE) is provided. The UE may comprise a Radio Frequency (RF) unit configured to transmit and receive a radio signal, and a processor configured to operate in conjunction with the RF unit. The processor may be further configured: determine whether or not a transmission time of feedback information on sidelink Semi Persistent Scheduling (SPS) information and a transmission time of feedback information on a Wide Area Network (WAN) Physical Downlink Shared Channel (PDSCH) overlap, and based on the determination, transmit the feedback information on the sidelink SPS information and the feedback information on the WAN PDSCH. When the transmission time of the feedback information on the sidelink SPS information and the transmission time of the feedback information on the WAN PDSCH overlap, the feedback information on the sidelink SPS information and the feedback information on the WAN PDSCH may be transmitted by means of multiplexing or on the basis of a priority order.

According to the present invention, when a transmission time of feedback (or control) information on sidelink SPS information and a transmission time of the feedback (or control) information on the WAN PDSCH partially or entirely overlap, a V2X UE may multiplex the feedback (or control) information on the sidelink SPS and the feedback (or control) information on the WAN PDSCH and transmit the multiplexed information. Accordingly, it is possible to efficiently transmit the feedback (or control) information on the sidelink SPS and the feedback (or control) information on the WAN PDSCH to a base station, and, when receiving the multiplexed information, the base station may be able to efficiently manage the feedback (or control) information on the sidelink SPS and the feedback (or control) information on the WAN PDSCH.

According to the present invention, when a transmission time of feedback (or control) information on sidelink SPS information and a transmission time of the feedback (or control) information on the WAN PDSCH partially or entirely overlap, a V2X UE may transmit the feedback (or control) information on the sidelink SPS and the feedback (or control) information on the WAN PDSCH and transmit multiplexed information on a priority order basis. Accordingly, since the UE according to the present invention is able to transmit information of a high priority level to a base station, it is possible to efficiently transmit information, and, when receiving the information on a priority order basis, the base station may be able to efficiently manage the feedback (or control) information on the sidelink SPS and the feedback (or control) information on the WAN PDSCH.

DESCRIPTION OF EXEMPLARY EMBODIMENTS

Figure 1:
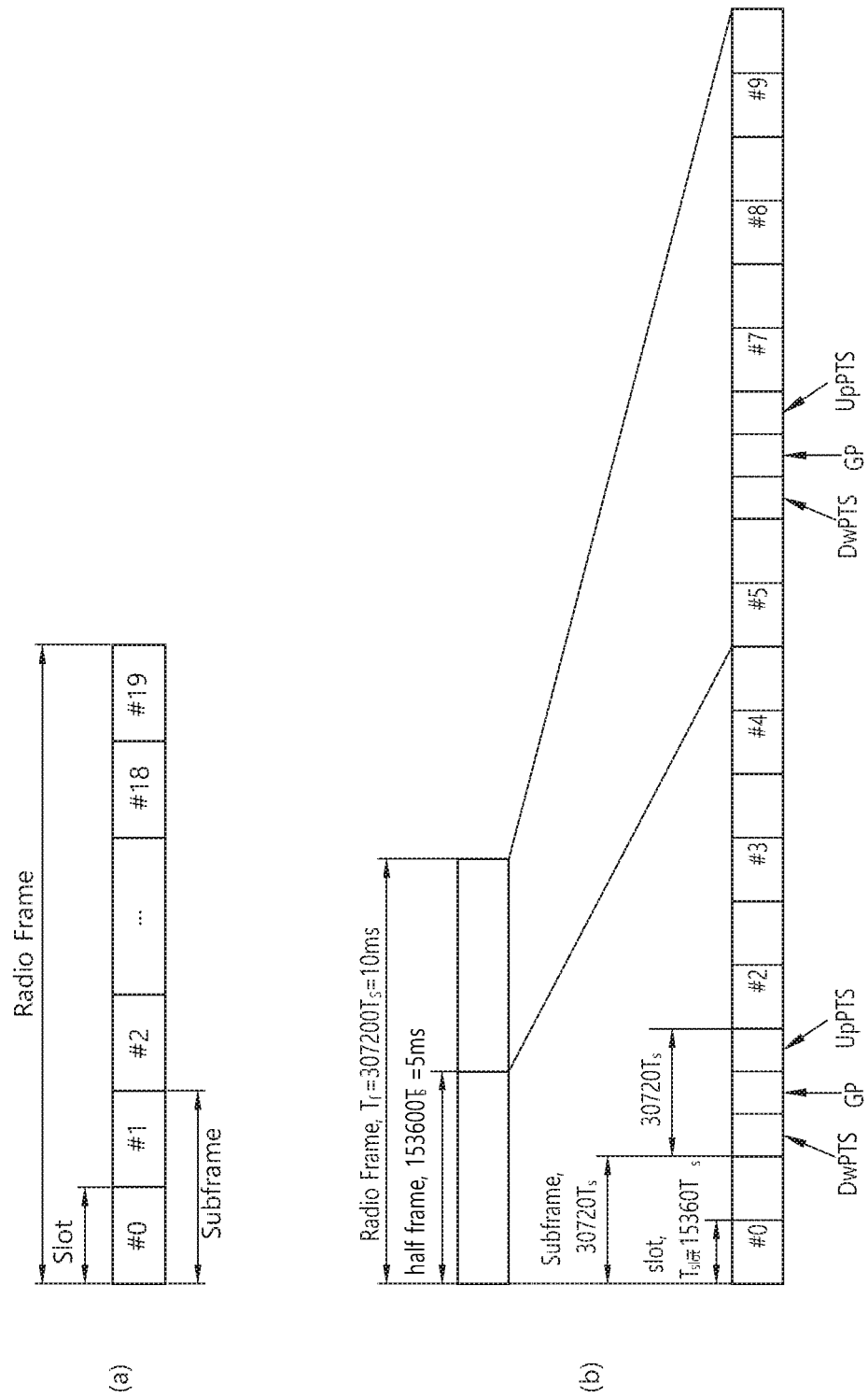
FIG. 1 illustrates an exemplary radio frame structure used in a wireless communication system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

Also, technique, device, system, which will be described hereinafter, may be applied to various wireless multiplexing access systems. For convenience of description, it is assumed that the present invention is applied to a 3GPP LTE(-A). However, it is to be understood that technical features of the present invention are limited to the 3 GPP LTE(-A). For example, although the following description will be made based on a mobile communication system corresponding to a 3GPP LTE(-A) system, the following description may be applied to other random mobile communication system except matters specific to the 3GPP LTE(-A).

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term BS' may be replaced with 'Advanced Base Station (ABS)', 'Node B', 'evolved-Node B (eNB)', 'Base Transceiver System (BTS)', 'Access Point (AP)', 'Processing Server (PS)', etc.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/ PRACH (Physical Random Access Channel) refer to sets of time-frequency resources or resource elements respectively carrying UCI (Uplink Control Information)/uplink data/ random access signals. In the present invention, a time-frequency resource or a resource element (RE), which is allocated to or belongs to PDCCH/PCFICH/PHICH/ PDSCH/PUCCH/PUSCH/PRACH, is referred to as a PDCCH/PCFICH/PHICH/PDSCH/PUCCH/PUSCH/ PRACH RE or PDCCH/PCFICH/PHICH/PDSCH/PUCCH/ PUSCH/PRACH resource. In the following description, transmission of PUCCH/PUSCH/PRACH by a UE is equivalent to transmission of uplink control information/ uplink data/random access signal through or on PUCCH/ PUSCH/PRACH. Furthermore, transmission of PDCCH/ PCFICH/PHICH/PDSCH by an eNB is equivalent to transmission of downlink data/control information through or on PDCCH/PCFICH/PHICH/PDSCH.

Also, in the present invention, Cell-specific Reference Signal (CRS)/Demodulation Reference Signal (DMRS)/ Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols. Also, in the present invention, SRS time-frequency resources (or REs) may mean time-frequency resources (or REs) transmitted from the user equipment to the base station to allow the base station to carry a sounding reference signal (SRS) used for measurement of an uplink channel status formed between the user equipment and the base station. The reference signal (RS) means a signal of a special waveform previously defined and known well by the user equipment and the base station, and may be referred to as a pilot.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/ LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink (DL) transmission is discriminated from uplink (UL) transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
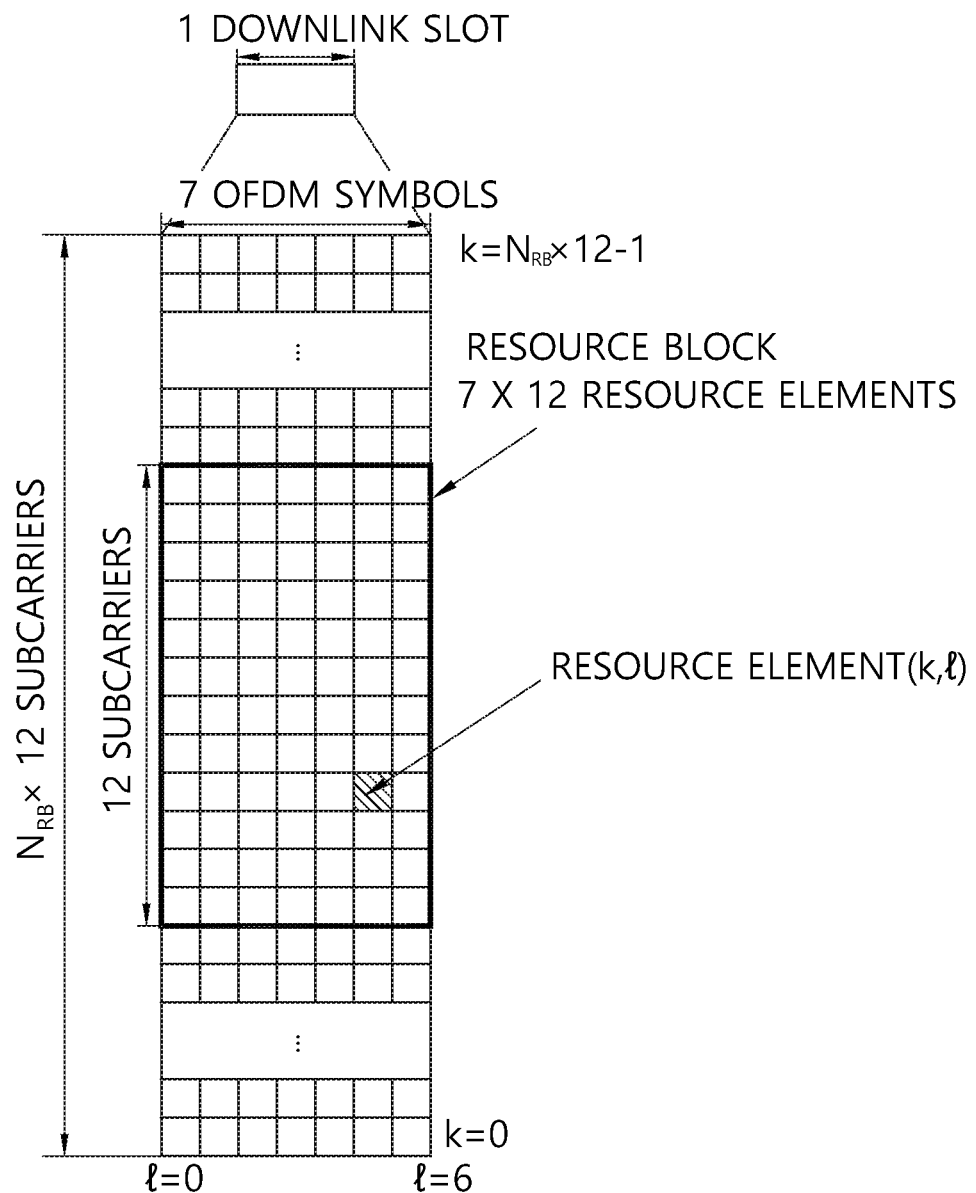
FIG. 2 illustrates an exemplary downlink/uplink slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

A slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of NRB DL/UL*Nsc RB subcarriers and Nsymb DL/UL OFDM symbols. Here, NRB DL denotes the number of RBs in a downlink slot and NRB UL denotes the number of RBs in an uplink slot. NRB DL and NRB UL respectively depend on a DL transmission bandwidth and a UL transmission bandwidth. Nsymb DL denotes the number of OFDM symbols in the downlink slot and Nsymb UL denotes the number of OFDM symbols in the uplink slot. In addition, Nsc RB denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes NRB DL/UL*Nsc RB subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by Nsymb DL/UL (e.g. 7) consecutive OFDM symbols in the time domain and Nsc RB (e.g. 12) consecutive subcarriers in the frequency domain. For reference, a resource composed by an OFDM symbol and a subcarrier is called a resource element (RE) or a tone. Accordingly, an RB is composed of Nsymb DL/UL*Nsc RB REs. Each RE in a resource grid can be uniquely defined by an index pair (k, l) in a slot. Here, k is an index in the range of 0 to Nsymb DL/UL*Nsc RB-1 in the frequency domain and l is an index in the range of 0 to Nsymb DL/UL-1.

Two RBs that occupy Nsc RB consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to NVRB DL-1, and NVRB DL*NRB DL is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
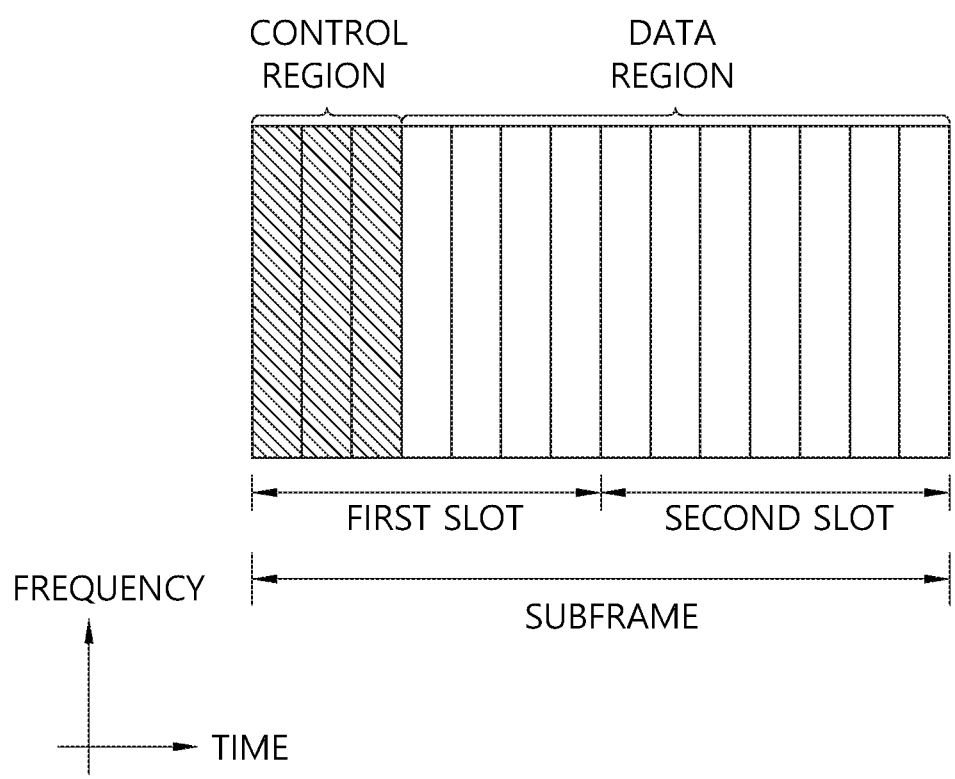
FIG. 3 illustrates a downlink (DL) subframe structure used in 3GPP LTE/LTE-A.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
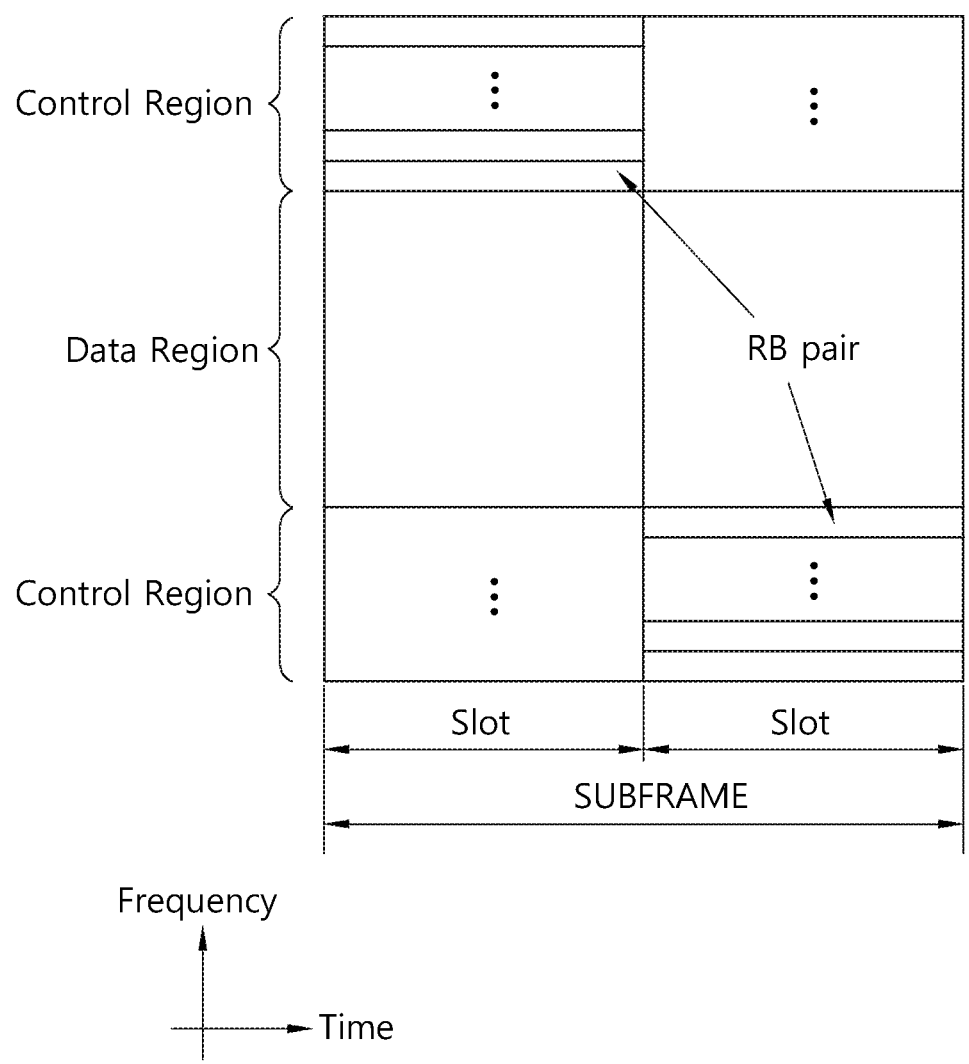
FIG. 4 is a diagram showing an example of an uplink subframe structure used in a 3GPP LTE(-A) system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency f0 in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK orSR + ACK/NACK | One codeword |
| 1b | QPSK | 2 | ACK/NACK orSR + ACK/NACK | Two codeword |
| 2 | QPSK | 20 | CQI/PMI/RI | Joint coding ACK/NACK(extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK orSR + ACK/NACKorCQI/PMI/RI + ACK/NACK | |

Referring to Table 2, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Figure 5:
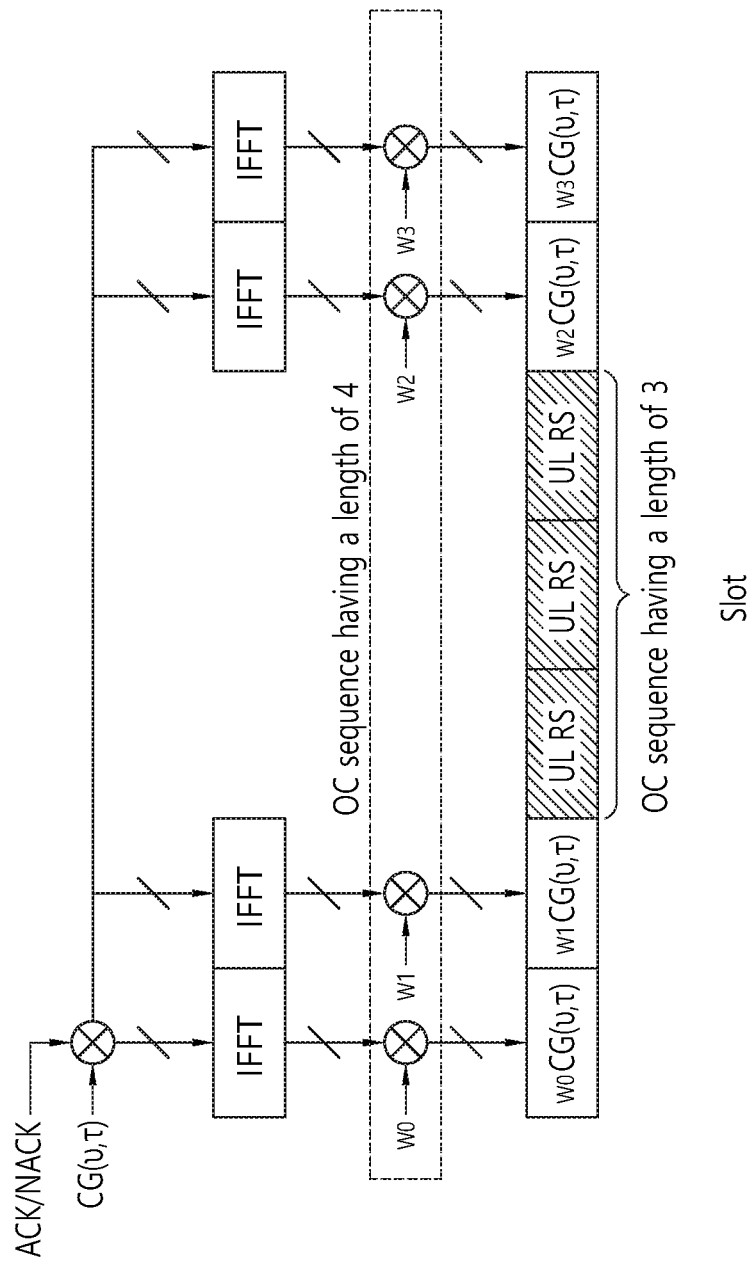
FIG. 5 to FIG. 6 exemplarily show UCI transmission according to PUCCH formats.
Figure 6:
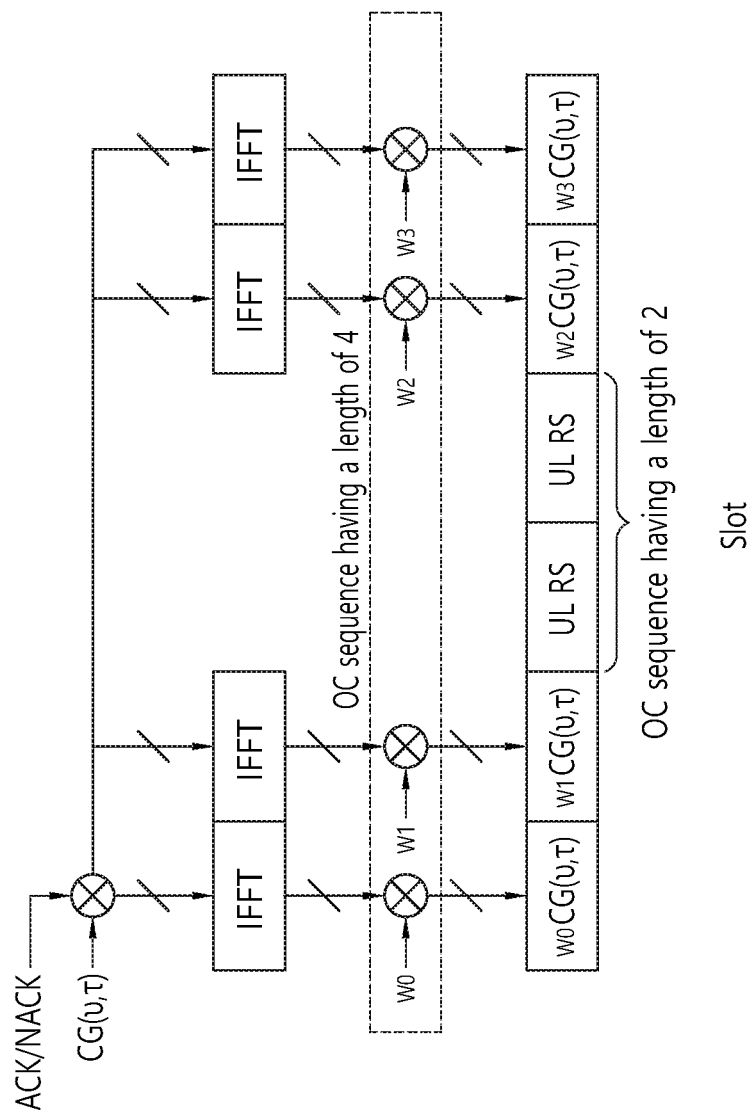

FIG. 5 to FIG. 6 exemplarily show UCI transmission according to PUCCH formats.

In a 3GPP LTE(-A) system, a DL/UL subframe with a normal CP consists of two slots each including 7 OFDM symbols and a DL/UL subframe with an extended CP consists of two slots each having 6 OFDM symbols. Since the number of OFDM symbols per subframe varies with CP length, a structure in which a PUCCH is transmitted in a UL subframe also varies with the CP length. Accordingly, a UCI transmission method of a UE in the UL subframe depends on a PUCCH format and the CP length.

FIG. 5 illustrates an example of transmitting ACK/NACK information using PUCCH format 1a/1b in a UL slot with a normal CP and FIG. 6 illustrates an example of transmitting ACK/NACK information using PUCCH format 1a/1b in a UL slot with an extended CP.

Referring to FIGS. 5 and 6, control information transmitted using PUCCH formats 1a and 1b is repeated with the same contents on a slot basis in a subframe. In each UE, ACK/NACK signals are transmitted on different resources which are configured with different cyclic shifts (CSs) (frequency domain codes) of a computer-generated constant amplitude zero autocorrelation (CG-CAZAC) sequence and orthogonal covers (OCs) or orthogonal cover codes (OCCs) (time domain spread codes). An OCC is also referred to as an orthogonal sequence. An OC includes, for example, a Walsh/DFT OC. Provided that the number of CSs is 6 and the number of OCs is 3, a total of 18 PUCCHs may be multiplexed in the same physical resource block (PRB) based on a single antenna port. Orthogonal sequences w0, w1, w2 and w3 may be applied in either an arbitrary time domain (after FFT modulation) or an arbitrary frequency domain (before FFT modulation). In the 3GPP LTE(-A) system, a PUCCH resource for ACK/NACK transmission is expressed as a combination of the position of a time-frequency resource (e.g. PRB), a CS of a sequence for frequency spreading, and an (quasi) OC for time spreading and each PUCCH resource is indicated using a PUCCH resource index (also referred to as a PUCCH index). A PUCCH format 1 series for scheduling request (SR) transmission is the same in a slot level structure as PUCCH format 1a and 1b and differs only in a modulation method from the PUCCH formats 1a and 1b.

FIGS. 7 to 10 exemplarily show a PUCCH format 3 and associated signal processing according to the embodiments of the present invention. Particularly, FIGS. 7 to 9 exemplarily show the DFT-based PUCCH format structure. According to the DFT-based PUCCH structure, DFT precoding is performed in PUCCH and a time domain orthogonal cover (OC) is applied to the PUCCH at SC-FDMA level before the PUCCH is transmitted. The DFT-based PUCCH format is generically named as a PUCCH format 3.

Figure 7:
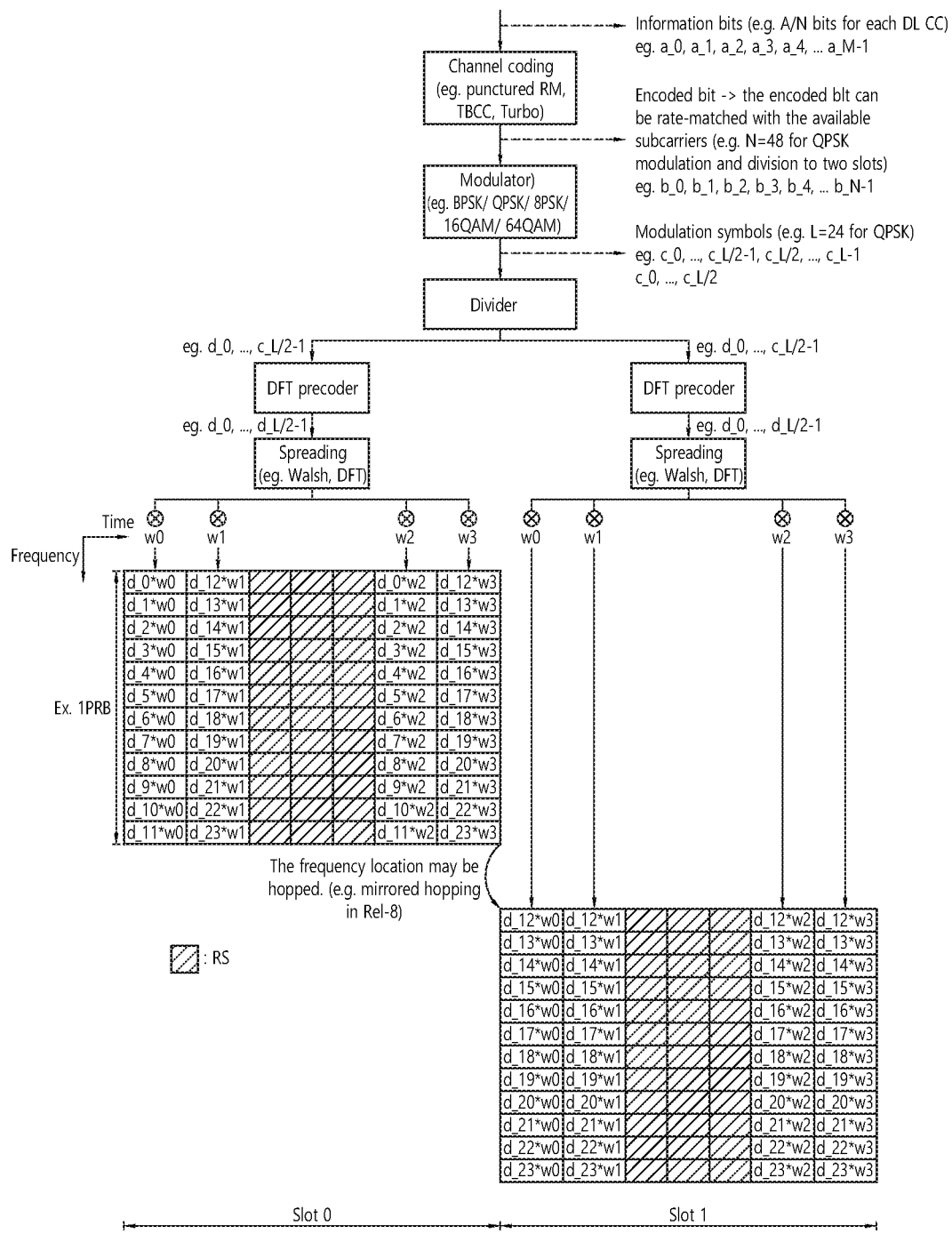
FIG. 7 to FIG. 10 exemplarily show a PUCCH format 3 and associated signal processing according to the embodiments of the present invention.

FIG. 7 exemplarily shows the PUCCH format 3 structure using the orthogonal code (OC) of SF=4. Referring to FIG. 7, the channel coding block performs channel coding of the information bits ($a\_0, a\_1, \ldots, a\_{M-1}$) (e.g., multiple ACK/NACK bits), thereby generating the encoded bits (coded bit or coding bit)(or codeword) ($b\_0, b\_1, \ldots, b\_{N-1}$). M is the size of information bit, and N is the size of coding bit. The information bit may include UCI, for example, multiple ACK/NACK data for multiple data units (or PDSCHs) received through multiple DL CCs. In this case, the information bit ($a\_0, a\_1, \ldots, a\_{M-1}$) is joint-coded irrespective of categories/numbers/sizes of UCIs constructing the information bit. For example, if the information bit includes multiple ACK/NACK data of several DL CCs, the channel coding is not performed per DL CC or per ACK/NACK bit, but performed for the entire bit information, such that a single codeword is generated. The channel coding is not limited thereto, and includes simple repetition, simplex coding, Reed Muller (RM) coding, punctured RM coding, Tail-biting convolutional coding (TBCC), low-density parity-check (LDPC) or turbo-coding. Although not shown in the drawings, the coding bit may be rate-matched in consideration of a modulation order and the amount of resources. The rate matching function may be included in some parts of the channel coding block or may be performed through a separate functional block. For example, the channel coding block may perform the (32,0) RM coding for several control information to obtain a single codeword, and cyclic buffer rate-matching for the obtained codeword may be performed.

The modulator modulates the coding bit ($b\_0, b\_1, \ldots, b\_{N-1}$) so as to generate the modulation symbol ($c\_0, c\_1, \ldots, c\_{L-1}$). L is the size of a modulation symbol. The modulation method may be performed by modifying the size and phase of a transmission (Tx) signal. For example, the modulation method may include n-PSK (Phase Shift Keying), n-QAM (Quadrature Amplitude Modulation) (where n is an integer of 2 or higher). In more detail, the modulation method may include BPSK (Binary PSK), QPSK (Quadrature PSK), 8-PSK, QAM, 16-QAM, 64-QAM, etc.

The divider distributes the modulation symbols ($c\_0, c\_1, \ldots, c\_{L-1}$) to individual slots. The order/pattern/scheme for distributing the modulation symbols to individual slots may not be specially limited. For example, the divider may sequentially distribute the modulation symbols to individual slots (i.e., localized scheme). In this case, as shown in the drawings, the modulation symbols ($c\_0, c\_1, \ldots, c\_{L/2-1}$) are distributed to Slot 0, the modulation symbols ($c\_{L/2}, c\_{L/2+1}, \ldots, c\_{L-1}$) may be distributed to Slot 1. In addition, the modulation symbols may be interleaved (or permuted) while being distributed to individual slots. For example, the even-th modulation symbols may be distributed to Slot 0, and the odd-th modulation symbols may be distributed to Slot 1. If necessary, the modulation process and the distribution process may be replaced with each other in order.

The DFT precoder performs DFT precoding (e.g., 12-point DFT) for the modulation symbols distributed to individual slots so as to generate a single carrier waveform. Referring to FIG. 25, the modulation symbols ($c\_0, c\_1, \ldots, c\_{L/2-1}$) distributed to Slot 0 may be DFT-precoded to DFT symbols ($d\_0, d\_1, \ldots, d\_{L/2-1}$), ad the modulation symbols ($c\_{L/2}, c\_{L/2+1}, \ldots, c\_{L-1}$) distributed to Slot 1 may be DFT-precoded to DFT symbols ($d\_{L/2}, d\_{L/2+1}, \ldots, d\_{L-1}$). The DFT precoding may be replaced with another linear operation (e.g., Walsh precoding).

The spreading block performs spreading of the DFT-processed signal at the SC-FDMA symbol level. The time domain spreading at the SC-FDMA symbol level may be performed using the spreading code (sequence). The spreading code may include a Quasi-orthogonal code and an orthogonal code. The Quasi-orthogonal code is not limited thereto, and may include a PN (Pseudo Noise) code as necessary. The orthogonal code is not limited thereto, and may include a Walsh code, a DFT code, etc. as necessary. Although the present embodiment is focused only upon the orthogonal code as a representative spreading code for convenience of description, the orthogonal code may be replaced with a Quasi-orthogonal code. A maximum value of the spreading code size (or the spreading factor (SF)) is limited by the number of SC-FDMA symbols used for control information transmission. For example, if four SC-FDMA symbols are used to transmit control information in one slot, orthogonal codes (w0, w1, w2, w3) each having the length of 4 may be used in each slot. SF means the spreading degree of control information, and may be relevant to the UE multiplexing order or antenna multiplexing order. SF may be changed according to system requirements, for example, in the order of 1, 2, 3, 4, . . . . The SF may be pre-defined between the BS and the UE, or may be notified to the UE through DCI or RRC signaling. For example, if one of SC-FDMA symbols for control information is punctured to achieve SRS transmission, the SF-reduced spreading code (e.g., SF=3 spreading code instead of SF=4 spreading code) may be applied to control information of the corresponding slot.

The signal generated through the above-mentioned process may be mapped to subcarriers contained in the PRB, IFFT-processed, and then converted into a time domain signal. The CP may be added to the time domain signal, and the generated SC-FDMA symbol may be transmitted through the RF unit.

Detailed description of individual process on the assumption that ACK/NACK for 5 DL CCs is transmitted will hereinafter be described. If each DL CC transmits two PDSCHs, associated ACK/NACK data includes a DTX state, and the ACK/NACK data may be composed of 12 bits. Assuming that QPSK modulation and 'SF=4' time spreading are used, the coding block size (after the rate matching) may be composed of 48 bits. The coding bit may be modulated into 24 QPSK symbols, and 12 QPSK symbols are distributed to each slot. In each slot, 12 QPSK symbol may be converted into 12 DFT symbols through the 12-point DFT operation. 12 DFT symbols in each slot may be spread and mapped to four SC-FDMA symbols using the SF=4 spreading code in a time domain. Since 12 bits are transmitted through [2 bits*12 subcarriers*8 SC-FDMA symbols], the coding rate is set to 0.0625(=12/192). In case of SF=4, a maximum of four UEs may be multiplexed to one PRB.

Figure 8:
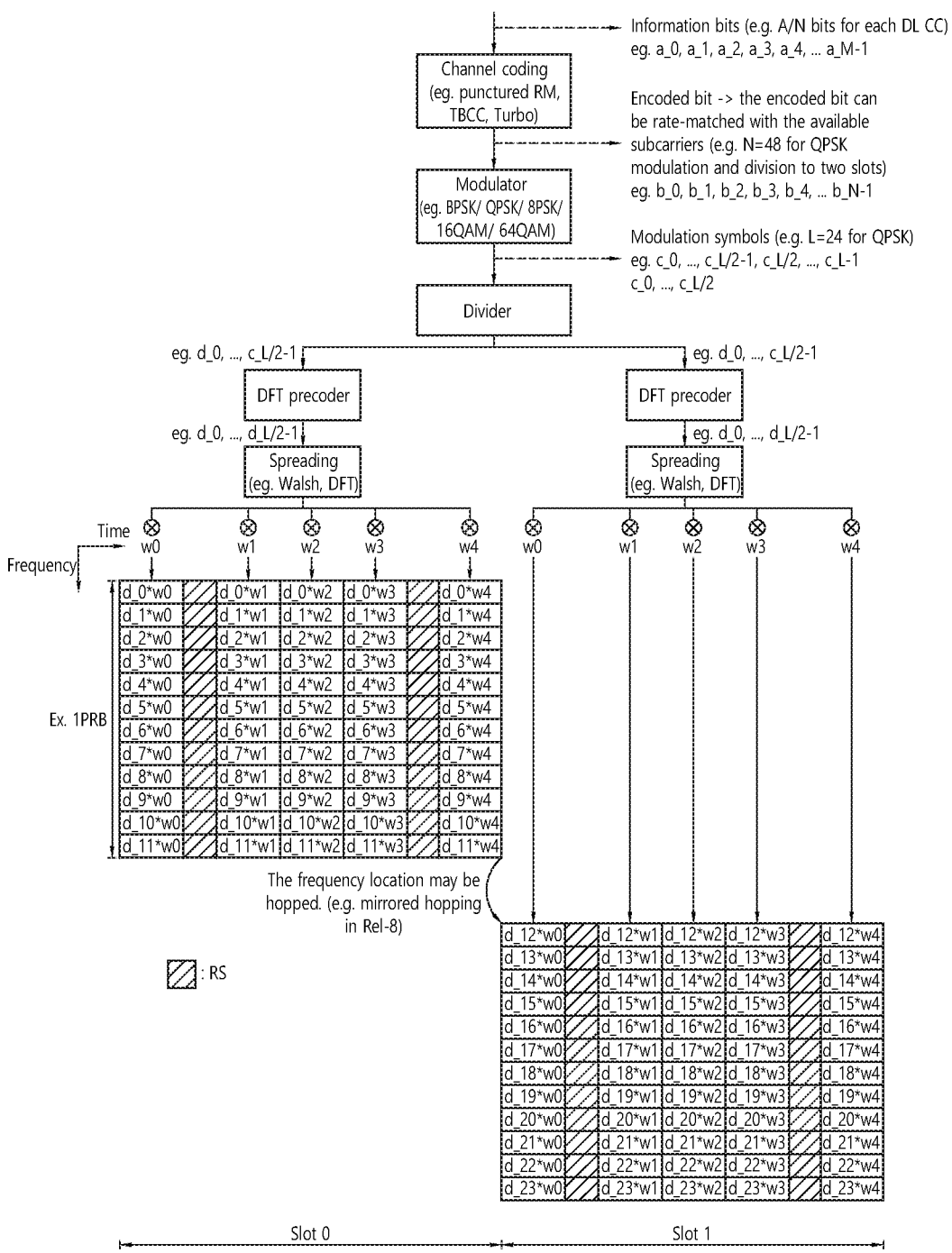

FIG. 8 exemplarily shows the PUCCH format 3 structure using the orthogonal code (OC) of SF=5.

The basic signal processing of FIG. 8 is identical to that of FIG. 7. Compared to FIG. 7, the number/position of UCI SC-FDMA symbols and the number/position of RS SC-FDMA symbols shown in FIG. 8 are different from those of FIG. 7. In this case, the spreading block may also be pre-applied to the previous stage of the DFT precoder as necessary.

In FIG. 8, the RS may succeed to the LTE system structure. For example, cyclic shift (CS) may be applied to a basic sequence. Since the data part includes SF=5, the multiplexing capacity becomes 5. However, the multiplexing capacity of the RS part is determined according to a cyclic shift (CS) interval (Δshift PUCCH). For example, the multiplexing capacity is given as 12/Δshift PUCCH. In case of Δshift PUCCH=1, the multiplexing capacity is set to 12. In case of ΔΔshift PUCCH=2, the multiplexing capacity is set to 6. In case of Δshift PUCCH=3, the multiplexing capacity is set to 4. In FIG. 8, while the multiplexing capacity of the data part is set to 5 because of SF=5, the RS multiplexing capacity is set to 4 in case of Δshift PUCCH, such that the resultant multiplexing capacity may be limited to 4 corresponding shift to the smaller one of two capacity values 5 and 4.

Figure 9:
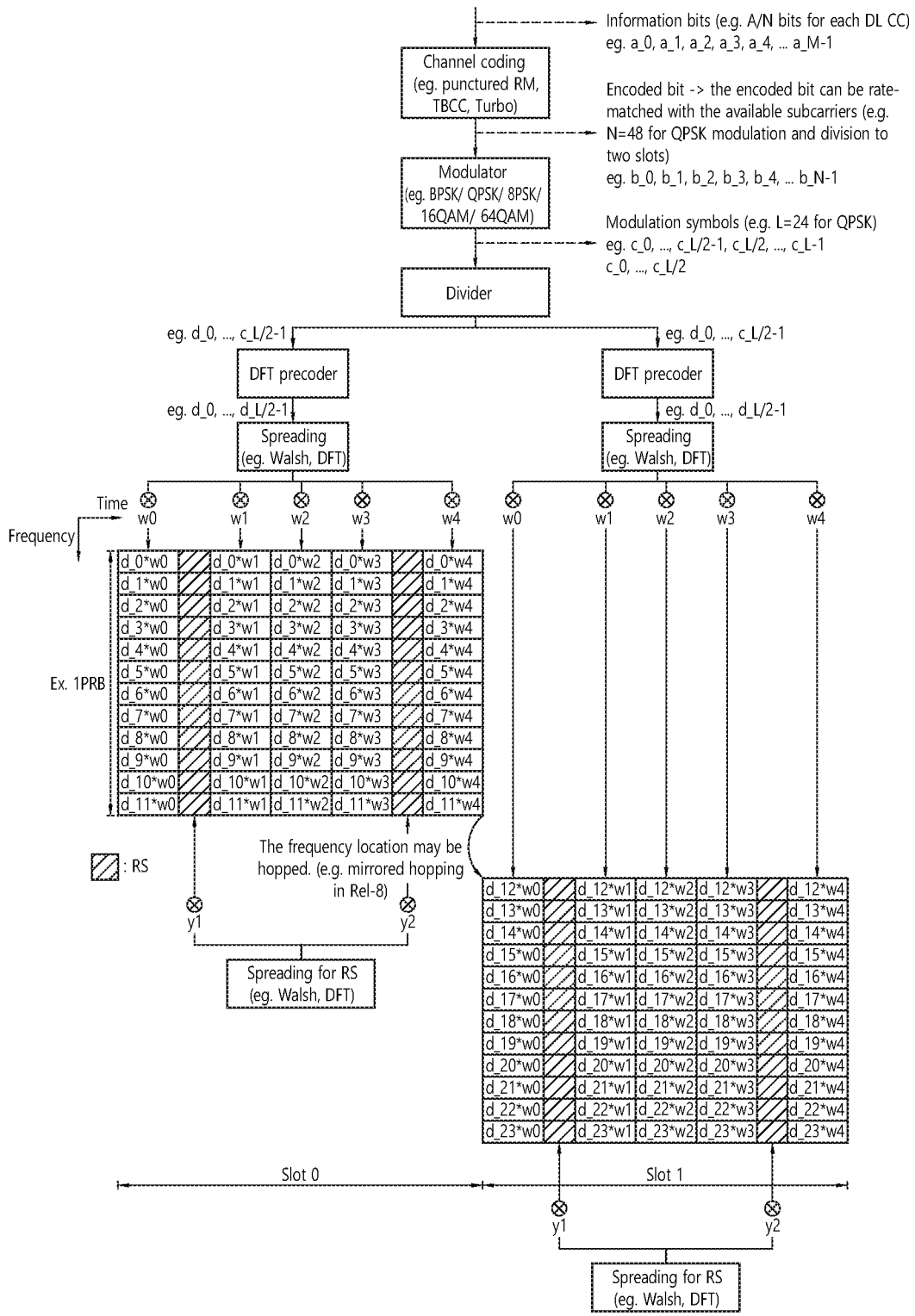

FIG. 9 exemplarily shows the PUCCH format 3 structure in which the multiplexing capacity is increased at a slot level.

The SC-FDMA symbol level spreading illustrated in FIGS. 7 and 8 is applied to RS, resulting in increase in the entire multiplexing capacity. Referring to FIG. 9, if a Walsh cover (or DFT code cover) is applied in the slot, the multiplexing capacity is doubled. Therefore, even in the case of Δshift PUCCH, the multiplexing capacity is set to 8, such that the multiplexing capacity of the data section is not decreased. In FIG. 9, [y1 y2]=[1 1] or [y1 y2]=[1−1], or linear conversion format (e.g., [j j] [j−j], [1−j] [1−j], or the like) may also be used as an orthogonal cover code for RS.

Figure 10:
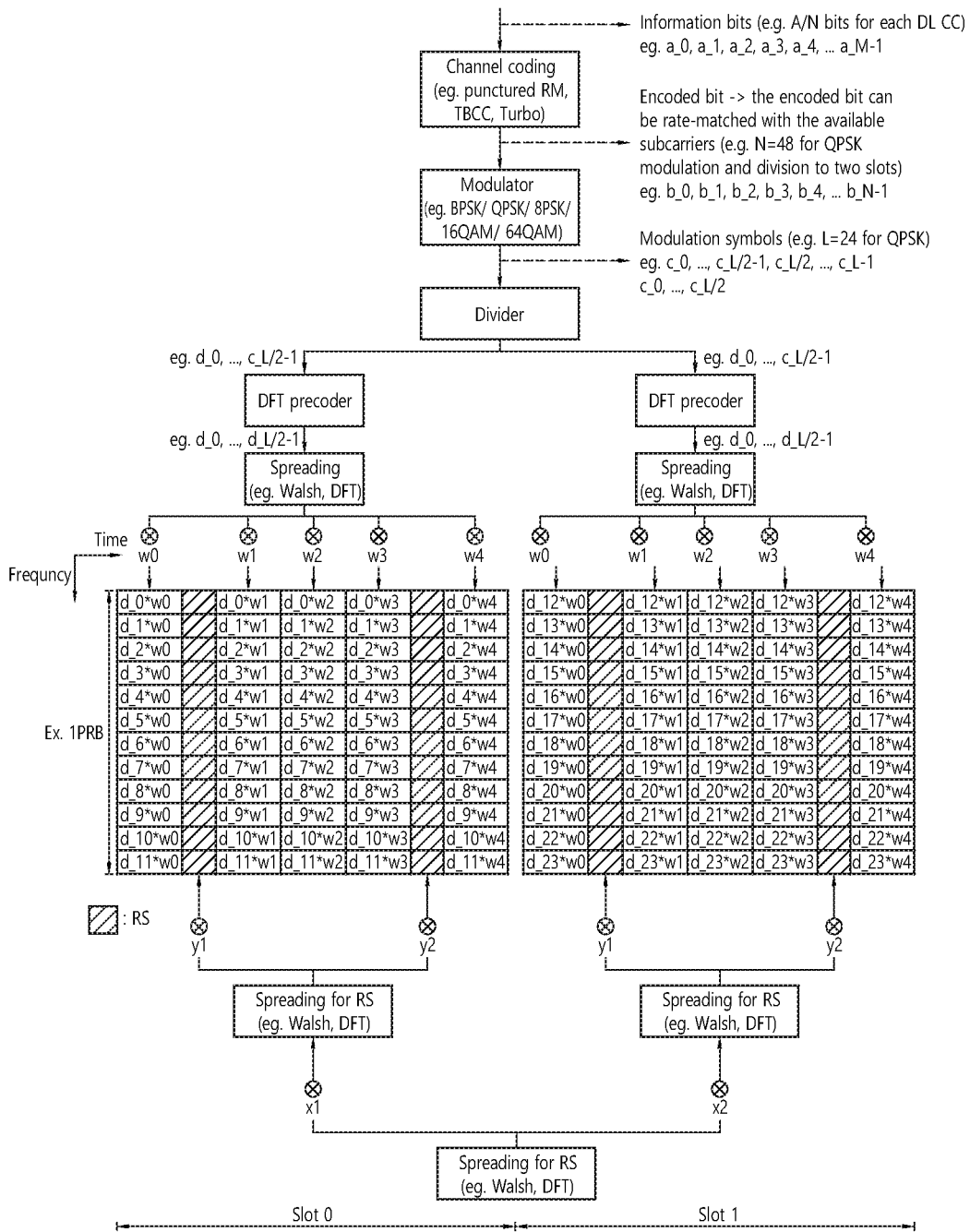

FIG. 10 exemplarily shows a PUCCH format 3 structure in which the multiplexing capacity can be increased at a subframe level.

If the frequency hopping is not applied to the slot level, the Walsh cover is applied in slot units, and the multiplexing capacity may be re-increased two times. In this case, as previously stated above, [x1 x2]=[1 1] or [1−1] may be used as the orthogonal cover code, and its modification format may also be used as necessary.

For reference, the PUCCH format 3 processing may be free of the orders shown in FIGS. 7 to 10.

Multiple carriers in carrier aggregation may be classified into PCell and SCell(s). The UE may accumulate responses to one or more PDCCHs and/or PDSCH having no PDCCH received on a DL PCell and/or DL SCell(s), and may transmit the accumulated responses on a PUCCH using a UL PCell. In this way, subframe(s) and/or CC(s) carrying a plurality of PDCCHs of which corresponding responses are transmitted through one UL PUCCH may be referred to as a bundling window. Although the time domain or the CC domain bundling described in the present embodiment may indicate the logical AND operation, it may also be performed through another method such as the logical OR operation, etc. That is, the time domain or the CC domain bundling may be a generic term of a variety of methods for representing a plurality of ACK/NACK parts covering several subframes or several CCs in the ACK/NACK response using a single PUCCH format. That is, X-bit ACK/NACK information may generically represent an arbitrary method for expressing X-bit ACK/NACK information using Y-bits (where X For example, the CC domain bundling is a scheme where the ACK/NACK response to the all DL subframes in the CC domain is set to "ACK" only if all ACK/NACK responses in the CC domain are ACK, otherwise the ACK/NACK response to the all DL subframes in the CC domain is set to "NACK/DTX," so that the number of ACK/NACK responses can be reduced.

In the CA TDD, multiple ACK/NACK responses for each CC may be transmitted by channel selection using the PUCCH format 1a/1b or by another channel selection using PUCCH format 3 or by PUCCH format 3. Implicit mapping or explicit mapping may be applied to the PUCCH resource index for the above-mentioned PUCCH formats, or a combination of the implicit mapping and the explicit mapping may also be applied thereto as necessary. For example, the implicit mapping may be used as a method for deriving a PUCCH resource index on the basis of the lowest CCE index of the corresponding PDCCH. For example, the explicit mapping may be used as a method for indicating or deriving the corresponding PUCCH resource index from among predetermined sets according to the RRC structure by the ACK/NACK Resource Indicator (ARI) value contained in the corresponding PDCCH.

Cases in which ACK/NACK feedback for DL is needed in a subframe n can be largely classified into the following three cases (Case 1, Case 2, Case 3).

Case 1: ACK/NACK feedback is needed for PDSCH(s) indicated by PDCCH(s) detected at the subframe(s) (n-k). In this case, K is denoted by (k∈K), K is changed according to the subframe index (n) and UL-DL structure, and is comprised of M elements {k0, k1, . . . kM−1}. Table 3 shows K composed of M elements {k0, k1, . . . kM−1} (i.e., K: {k0, k1, . . . kM−1}). Case 1 relates to PDSCH(s), each of which requires general ACK/NACK feedback. In the following description, Case 1 is referred to as 'ACK/NACK for PDSCH with PDCCH'.

Case 2: ACK/NACK feedback is needed for PDCCH(s) indicating DL SPS (Semi-Persistent Scheduling) release in subframe(s) (n-k). In this case, K is denoted by (kεK), and K is identical to that of Case 1. The ACK/NACK of Case 2 may indicate ACK/NACK feedback for PDCCH(s) for SPS release. In contrast, although ACK/NACK feedback for DL SPS release is performed, ACK/NACK feedback for PDCCH(s) indicating SPS activation is not performed. In the following description, Case 2 is referred to as 'ACK/NACK for DL SPS release'.

Case 3: ACK/NACK feedback is needed for transmission of PDSCH(s) having no PDCCH(s) detected at the subframe(s) n-k. In this case, K is denoted by (kεK), and K is identical to that of Case 1. Case 3 relates to PDSCH(s) without PDCCH(s), and may indicate ACK/NACK feedback for SPS PDSCH(s). In the following description, Case 3 is referred to as 'ACK/NACK for DL SPS'.

In the following description, the above-mentioned PDSCHs and PDCCHs, each of which requires the ACK/NACK feedback, may be generically named as DL allocation or DL transmission.

TABLE 3

Downlink association set index K: $\{k_0, k_1, \ldots k_{M-1}\}$ for TDD

| UL-DLCon-figuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | — | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In case of the FDD, M is always set to 1, and K is denoted by ({k0}={4}).

The ACK/NACK channel selection may indicate the ACK/NACK channel selection scheme for employing implicit resources (linked to the lowest CCE index) corresponding to a PDSCH scheduling each PDSCH of the corresponding UE so as to guarantee PUCCH resources of each UE. The ACK/NACK channel selection scheme will hereinafter be described with reference to Table 4.

TABLE 4

| HARQ-ACK(0), HARQ-ACK(1), HARQ-ACK(2), HARQ-ACK(3) | $n^{(1)}_{PUCCH}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |

TABLE 4-continued

| HARQ-ACK(0), HARQ-ACK(1), HARQ-ACK(2), HARQ-ACK(3) | $n^{(1)}_{PUCCH}$ | b(0), b(1) |
|---|---|---|
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

TABLE 5

| HARQ-ACK(0), HARQ-ACK(1), HARQ-ACK(2), HARQ-ACK(3) | $n^{(1)}_{PUCCH}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,2}$ | 1, 1 |
| ACK, ACK, NACK/DTX, ACK | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 1, 1 |
| ACK, NACK/DTX, ACK, NACK/DTX | $n^{(1)}_{PUCCH,2}$ | 1, 0 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,1}$ | 0, 0 |
| NACK/DTX, ACK, ACK, NACK/DTX | $n^{(1)}_{PUCCH,2}$ | 0, 1 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| NACK, NACK/DTX, NACK/DTX, NACK/DTX | $n^{(1)}_{PUCCH,0}$ | 0, 0 |
| DTX, NACK/DTX, NACK/DTX, NACK/DTX | | No Transmission |

In Table 4, HARQ-ACK(i) (i=0, 1, 2, 3) may indicate the ACK/NACK result of a data unit (i). The data unit (i) may indicate a data that requires ACK/NACK. For example, the data unit (i) may indicate each CCE. n(1) PUCCH may denote PUCCH resources to be used for actual ACK/NACK transmission. In Table 4, a total of 4 PUCCH resources (i.e., n(1) PUCCH,0, n(1) PUCCH,1, n(1) PUCCH,2, n(1) PUCCH,3) are used. b(0), b(1) may indicate two bits to be transferred by the selected PUCCH resources. ACK/NACK for a total of four data units may exemplarily show a total of 20 cases. The 20 cases may be mapped to the corresponding values b(0),b(1) in each PUCCH resource, and the mapped result may be transmitted. This scheme may correspond to the ACK/NACK channel selection.

Figure 11:
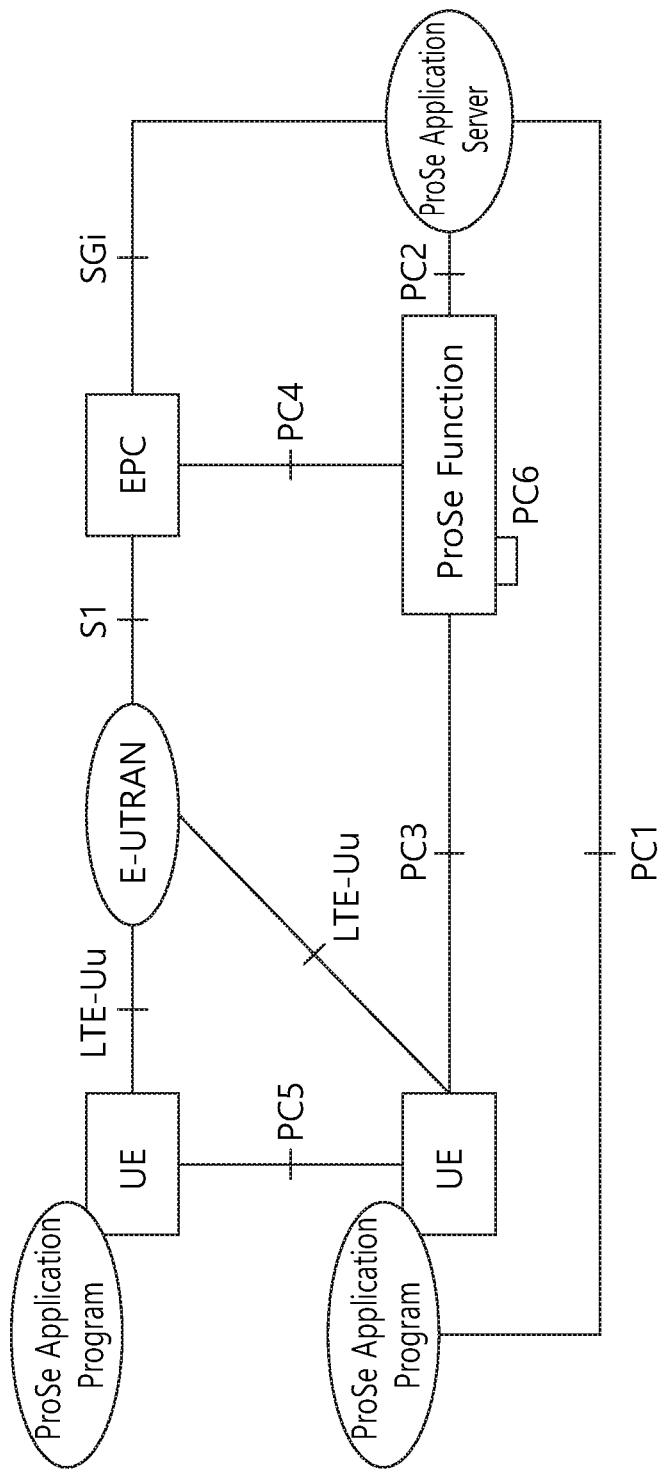
FIG. 11 illustrates a reference structure for a ProSe.

FIG. 11 illustrates a reference structure for a ProSe.

Referring to FIG. 11, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe direct communication (D2D communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 12:
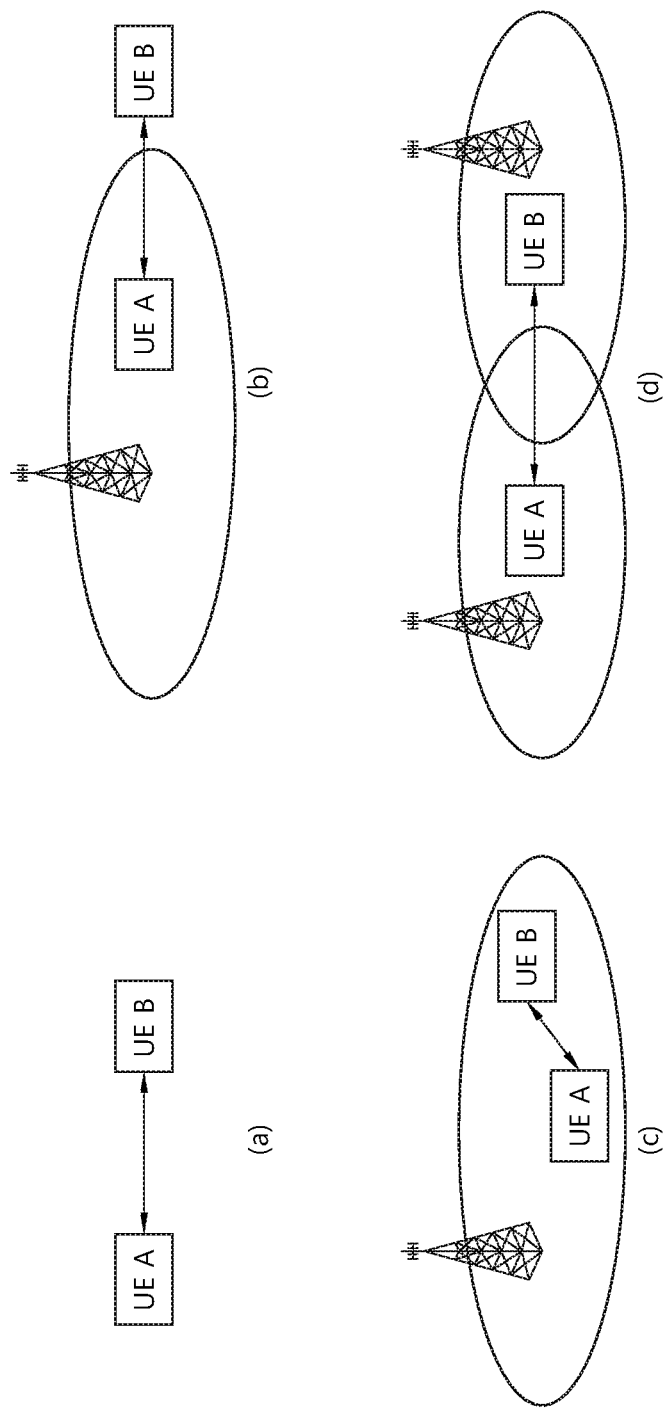
FIG. 12 illustrates arrangement examples of terminals performing ProSe direct communication and cell coverage.

FIG. 12 illustrates arrangement examples of terminals performing ProSe direct communication and cell coverage.

Referring to FIG. 12(a), UEs A and B may be located outside of the cell coverage. Referring to FIG. 12(b), the UE A may be located in the cell coverage and the UE B may be located outside of the cell coverage. Referring to FIG. 5(c), both of UEs A and B may be located in the cell coverage. Referring to FIG. 5(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 13:
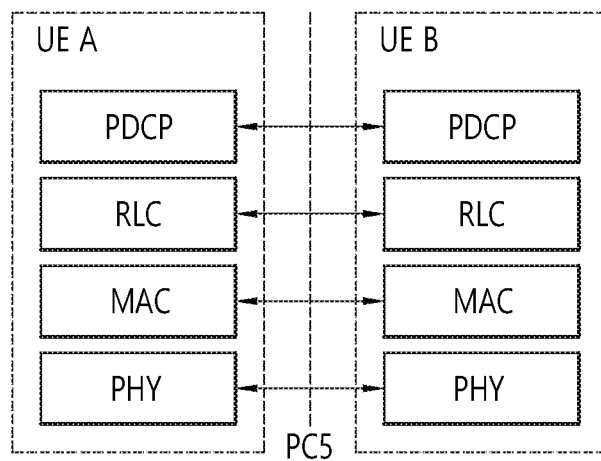
FIG. 13 illustrates a user plane protocol stack for the ProSe direct communication.

FIG. 13 illustrates a user plane protocol stack for the ProSe direct communication.

Referring to FIG. 13, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio resource assignment for ProSe direct communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 14:
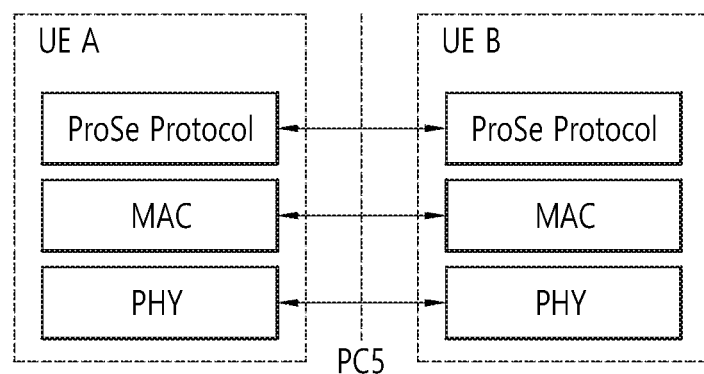
FIG. 14 illustrates a PC 5 interface for D2D discovery.

FIG. 14 illustrates a PC 5 interface for D2D discovery.

Referring to FIG. 14, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, the V2X is described.

As described above, a D2D operation generally has various advantages in that the D2D operation is signal transmission/reception between neighboring devices. For example, a D2D terminal has a high data rate and a low latency and is capable of data communication. In addition, the D2D operation can enable distribution of traffic concentrated on a base station, and thus, if the D2D terminal serves as a relay, the D2D operation can expand the coverage of the base station. An expanded version of the above-described D2D communication includes including signal transmission/reception between vehicles, and a communication technology relating to vehicles is called Vehicle-To-X (V2X) communication.

Herein, for example, the term "X" in V2X means pedestrian (communication between a vehicle and a device carried by an individual (for example) handheld terminal carried by a pedestrian, cyclist, driver or passenger)) (V2P), vehicle (communication between vehicles) (V2V), infrastructure/network (communication between a vehicle and a roadside unit (RSU)/network (for example) RSU is a transportation infrastructure entity (for example) an entity transmitting speed notifications) implemented in an eNB or a stationary UE)) (V2I/N). In addition, for example, for convenience of explanation of a proposed method, a (V2P communication-related) device carried by a pedestrian (or human) will be referred to as "P-UE", and a (V2X communication-related) device installed at a vehicle will be referred to as "V-UE". In addition, for example, the term "entity" in the present invention may be understood as a P-UE and/or a V-UE and/or RSU(network/infrastructure).

A UE providing (or supporting) the above-described D2D operation may be referred to a D2D UE, and a UE providing (or supporting) the above-described V2X operation may be referred to as a V2X UE. Hereinafter, for convenience of explanation, embodiments of the present invention will be described mainly from the perspective of the V2X UE, but description about the V2X UE may apply even to the D2D UE.

The V2X UE may transmit a message (or channel) on a predefined (or signaled) resource pool. Herein, the resource pool may indicate a resource(s) which is pre-defined for a UE to perform a V2X operation (or to be capable of performing a V2X operation). The resource poll may be, for example, defined in terms of a time/frequency.

Hereinafter, the present invention will be described.

Sidelink (or uplink) semi-persistent scheduling (SPS) and a WAN (unicast) PDSCH may be signaled (or set) to a V2X terminal. In this case, the terminal may transmit feedback (or control) information on the sidelink (or uplink) SPS and feedback (or control) information on the WAN (unicast) PDSCH, and a transmission time of the feedback (or control) information on the sidelink (uplink) SPS and a transmission time of the feedback (or control) information on the WAN (unicast) PDSCH may partially or entirely overlap. If the transmission time of the feedback (or control) information on the sidelink (uplink) SPS and the transmission time of the feedback (or control) information on the WAN (unicast) PDSCH partially or entirely overlap, the question lies in how the V2X terminal multiplexes the feedback (or control) information on the sidelink (or uplink) SPS and the feedback (or control) information on the WAN (unicast) PDSCH and transmits the multiplexed information or which one of the feedback (or control) information on the sidelink (or uplink) SPS and the feedback (or control) information on the WAN (unicast) PDSCH the V2X terminal transmits first.

Hereinafter, there are described a method in which a V2X terminal efficiently transmits feedback (or control) information on a (sidelink (or uplink)) SPS and feedback (or control) information on a WAN (unicast) PDSCH when a transmission time of the feedback (or control) information on the (sidelink (or uplink)) SPS and the feedback (or control) information on the WAN (unicast) PDSCH partially or entirely overlap, and a terminal using the same.

More specifically, there are suggested schemes by which a V2X UE(s) efficiently multiplexes (or reports) feedback (or control) information on (A) sidelink (or uplink) semi-persistent scheduling (SPS) and (B) feedback (or control) information on a WAN (unicast) PDSCH.

For convenience of explanation, an example may be provided as below:

(A) "feedback information on a sidelink (or uplink) SPS" may be interpreted as "ACK/NACK information on "sidelink (or uplink) SPS activation/release message (or DCI) (SL (or UL)-SPS grant)" (received by a V2X UE(s) from a (serving base station) (or (when a plurality of SPS configurations (or processors) is set (or signaled)) "TX (or non-TX intention indicator" related to a particular SPS configuration (or process) transmitted by a V2X UE(s) (e.g., the V2X UE(s) transmits "TX (or non-TX) intention indicator" (TX indicator) related to the particular SPS configuration (process) to the (serving) base station to thereby inform that the V2X UE(s) has (does not have) "intention to transmit data" (in the next time) on a resource related to the particular SPS configuration (or process)) or "release (or activation) request message" (release/activation request) related to the particular configuration (or process)).

(B) "feedback (or control) information on a WAN (unicast) PDSCH" may be interpreted as ACK/NACK information on a WAN (unicast) PDSCH (unicast grant).

Here, for example, when receiving (a) TX (or non-TX) intention indicator" and/or (B) "release (or activation) request message" from a V2X UE(s), a (serving) base station may make a determination as to (need for) "release" (or "activation") of a corresponding particular SPS configuration (or process).

Figure 15:
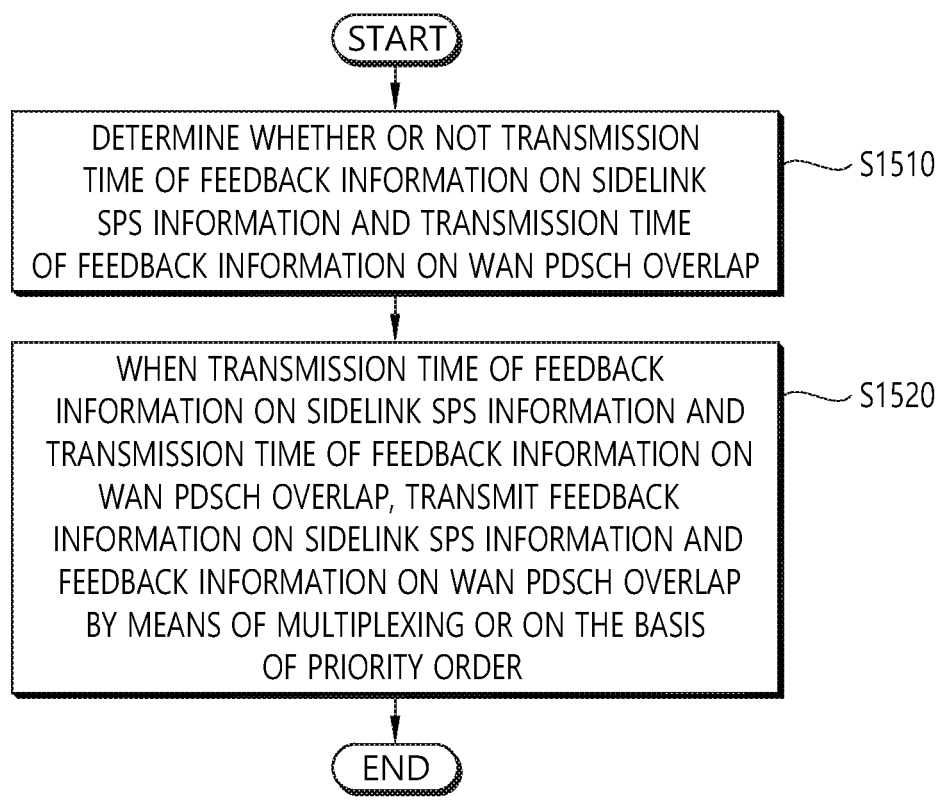
FIG. 15 is a flowchart illustrating a method of transmitting feedback information according to an embodiment of the present invention.

FIG. 15 is a flowchart illustrating a method of transmitting feedback information according to an embodiment of the present invention.

Referring to FIG. 15, a UE determines whether or not a transmission time of feedback information on sidelink (or uplink) SPS information and a transmission time of feedback information on a WAN (unicast) PDSCH overlap (S1510). In this case, the UE may be a V2X UE. In addition, as described above, the feedback information on the sidelink (or uplink) SPS information may be ACK/NACK information on an SL(UL)-SPS grant, a particular SPS configuration (or process)-related TX indicator, or a particular SPS configuration (or process)-related release/activation request. In addition, the feedback information on the WAN (unicast) PDSCH may be ACK/NACK information on a unicast grant.

Next, when the transmission time of the feedback information on the sidelink (or uplink) SPS information and the transmission time of the feedback information on the WAN (unicast) PDSCH overlap, the UE may transmit the feedback information on the sidelink (or uplink) SPS information and the feedback information on the WAN (unicast) PDSCH by means of multiplexing or on the basis of a priority order (S1520). That is, the UE determines whether or not the transmission time of the feedback information on the sidelink (or uplink) SPS information and the transmission time of the feedback information on the WAN (unicast) PDSCH overlap, and then transmits the feedback information on the sidelink (or uplink) SPS information and the feedback information on the WAN (unicast) PDSCH, wherein, when the transmission time of the feedback information on the sidelink (or uplink) SPS information and the transmission time of the feedback information on the WAN (unicast) PDSCH overlap, the feedback information on the sidelink (or uplink) SPS information and the feedback information on the WAN (unicast) PDSCH may be transmitted by means of multiplexing or on the basis of a priority order. In this case, specific examples to which the present invention is applied may be as follows.

[Proposed Method #1] For example, in the case where a transmission mode supporting up to 2 TB is set, when "unicast grant" and/or "SL(or UL)-SPS grant" is received, mapping of a PUCCH resource and/or ACK/NACK bit may be performed in the following ways.

(Example #1-1) PUCCH Resource

Two implicit PUCCH resource linked to "lowest CCE index CCE (N_CCE)" of "unicast grant", and one implicit PUCCH resource linked to "SL (or UL)-SPS grant are allocated.

(Example #1-2) ACK/NACK Bit Mapping

'HARQ-ACK(0)/(1)/(2)' on a channel selection (CHSel) table are a ACK/NACK response to a first TB of each "unicast-PDSCH", an ACK/NACK response to a second TB, and a ACK/NACK response to SL (or UL)-SPS grant and composed of 3 bits as such.

In another example, if a TM supporting up to 1 TB is set, a 2-bit CHSEL may be applied with two PUCCH resources while a (implicit) PUCCH resource linked to (N_CCE+1) "HARQ-ACK(2) (or HARQ-ACK(1))" are omitted from the above. In yet another example, when a TM supporting up to 1 TB is set, it may be set to transmit an ACK/NACK response to "unicast-PDSCH" through an implicit PUCCH resource linked to "lowest CCE index CCE (N_CCE)" of "unicast grant" and transmit an ACK/NACK response to "SL (or UL)-SPS grant" (or "TX indicator" or "release/activation request").

[Proposed Method #2] In the case where a CHSel in which a bundling window size (M) is "A" (A≤3) is set (in a TDD system), (A) if the last received or greatest "DL DAI value" is equal to or smaller than "A", a CHSel table corresponding to "M=A" (e.g., a method for allocating a PUCCH resource and configuring HARQ-ACK(i), the method proposed in the present disclosure) may be applied (identically), and/or, if the last received or greatest "DL DAI value" exceeds "A", that is, if the last received or greatest "DL DAI value" is "A+1", a CHSel table corresponding to "M=A+1" (e.g., a method for allocating a PUCCH resource and configuring HARQ-ACK(i), the method proposed in the present disclosure) may be applied (identically).

[Proposed Method #3] In the case where a CHSel in which a bundling window size (M) is "4" is set(in a TDD system), (A) if the last received or greatest "DL DAI value" is equal to or smaller than "4", a CHSel table corresponding to "M=4" may be applied, and/or, (B) if the last received or greatest "DL DAI value" exceeds "4", that is, if the last received or greatest "DL DAI value" is "5", an ACK/NACK response may be transmitted through a pre-defined (or signaled) (relatively large payload-sized) PUCCH format (e.g., PUCCH format 3 (PF 3). Here, for example, it may be interpreted such that, in the case of (A), "TPC field" of every "DL grant" indicates actual TPC information, whereas, in the case of (B), only "TPC field" corresponding to "(first) DL DAI=1" indicates actual TPC information and remaining "TPC field" corresponding to "DL DAI>1" indicates "PF 3"-related "ARI information".

[Proposed Method #4] In the need of multiplexing (or simultaneously transmitting) an ACK/NACK response to "unicast-PDSCH" and an ACK/NACK response to "SL (or UL)-SPS grant" (or "TX indicator" or "release/activation request"), it may be set such that transmission (of ACK/NACK responses) is always performed through a pre-defined (or signaled) (relatively large payload-sized) PUCCH format (e.g., PUCCH format 3 (PF 3)). Here, for example, this part may be given as a UE capability. Specifically, if a UE is "SL (or UL)-SPS supporting UE, "PF 3 capability" may be given, or, if a UE is a "SL (or UL)-SPS supporting UE" as well as "TDD operating UE", "PF3 capability" may be given.

[Proposed Method #5] In the need of simultaneously transmitting (or multiplexing) an ACK/NACK response to "unicast-PDSCH" and an ACK/NACK response to "SL (or UL)-SPS grant" (or "TX indicator" or "release/activation request"), (pre-set) "(spatial) bundling operation" may be applied between the ACK/NACK response to "unicast- PDSCH" and the ACK/NACK response to "SL (or UL)-SPS grant" (or "TX indicator" or "release/activation request").

Here, for example, in the TDD system, this operation may be limited to ACK/NACK responses to "unicast-PDSCH" and "SL (or UL)-SPS grant" transmitted through the same SP. In another example, (in the case where a TM supporting up to 2 TB is set), if it is necessary to simultaneously transmit (or multiplex) an ACK/NACK response to "unicast-PDSCH" and an ACK/NACK response to "SL (or UL)-SPS grant" (or "TX indicator" or "release/activation request), a "(spatial) bundling operation" may be applied to the ACK/NACK response to "unicast-PDSCH".

Here, for example, if simultaneous transmission of "CSI information" and "ACK/NACK responses" is set, there may be "up to 11 bits of CSI information" and "up to 3 bits of ACK/NACK (e.g., 2 bits of the ACK/NACK response to "unicast-PDSCH" and 1 bit of the ACK/NACK response to "SL (or UL)-SPS grant" (or "TX indicator" or "release/activation request")), and, in this case, only when "unicast-PDSCH" is for MIMO operation, information is provided in the form of 1 bit through the (spatial) bundling operation" and then transmitted together with the SL-SPS ACK/NACK (or "TX indicator" or "release/activation request") through the legacy operation.

[Proposed Method #6] In consideration of a possibility of failure to receive "SL (or UL)-SPS grant", PUSCH piggyback-related "total ACK/NACK payload size" (unicast-PDSCH total ACK/NACK payload size+1 bit (SL (or UL)-SPS grant)) may be assumed all the time. Here, for example, such an operation may be applied limitedly only when ACK/NACK information is piggyback to "UL grant-less" or "UL DAI-less PUSCH". Here, for example, the piggyback operation may be implemented with (PUSCH data (mapping)-related) "rate-matching (RM)" (or "puncturing"). Here, in another example, relevant information(s) (e.g., the ACK/NACK response to "unicast-PDSCH" and/or the ACK/NACK response to "SL (or UL)-SPS grant" (and/or "TX indicator" and/or "release activation request")) may be transmitted (or implemented) with "on-off keying" on a secured piggyback resource.

In yet another example, the ACK/NACK response to "SL (or UL)-SPS grant (or "TX indicator" or "release/activation request") may be transmitted using "DM-RS modulation form" (on a PUCCH format on which the ACK/NACK response to "unicast-PDSCH" is transmitted) (or the ACK/NACK response to "unicast-PDSCH" may be transmitted with "DM-RS modulation" (on a PUCCH format on which the ACK/NACK response to "SL (or UL)-SPS grant" (or "TX indicator" or "release activation request") is transmitted)). In yet another example, in order to prevent "unicast-PDSCH" and "SL (or UL)-SPS grant" from being received at the same point in time, (base station) scheduling restriction (regarding "unicast-PDSCH (or "SL (or UL)-SPS grant")) may be set.

Here, for example, in the case where a transmission mode supporting up to 2 TB is set (regarding WAN (unicast) PDSCH) (in an FDD system), (base station) scheduling restriction may be set (regarding "unicast-PDSCH" (or "SL (or UL)-SPS grant")), so that a "pre-set (or signaled) particular (single) TB (e.g., "first TB" or "second TB") and "SL (or UL)-SPS grant" are not received at the same time. Here, for example, in the case where this rule is applied, it may be interpreted such that only one TB is received (or transmitted) (or scheduled) at a reception (transmission) time of "SL (or UL)-SPS grant" (and/or it may be interpreted such that the ACK/NACK response to "SL (or UL)-SPS grant" is transmitted through a PUCCH resource linked to a remaining TB (which is not received (or transmitted) (or scheduled))).

Here, for example, in the case where this rule is applied, if "unicast-PDSCH" and "SL (or UL)-SPS grant" are received at the same time, it may be set such that the ACK/NACK response to "unicast-PDSCH" is (first) transmitted (e.g., the ACK/NACK response to "SL (or UL)-SPS grant" is omitted) (or the ACK/NACK response to "SL (or UL)-SPS grant" is (first) transmitted (e.g., the ACK/NACK response to "unicast-PDSCH" is omitted)).

In another example, it may be set such that a V2X UE(s) reports only "ACK/NACK information on a sidelink (or uplink) SPS activation message (or DCI)" received from a (serving) base station (or "ACK/NACK information on a sidelink (or uplink) SPS release message (or DCI)"), while not reporting "ACK/NACK information on a sidelink (or uplink) SPS release message (or DCI) (or "ACK/NACK information on a sidelink (or uplink) SPS activation message (or DCI)").

In yet another example, transmission of "TX indicator" (or "release/activation request") may be implemented by loading "information bit" on a "(pre-set (or signaled)) (single) PUCCH resource" to transmit information more than "on-off keying" (or implemented with "on-off keying"). Here, for example, if there are "two" pre-set (or signaled) SPS configurations (or processes), it may be set such that "1 bit" is transmitted on the "(pre-set (or signaled)) (single) PUCCH resource": (A) if all of the "two" SPS configurations (or processes) are used (or if all thereof are not used), "1 bit" may not be transmitted, and (B) if only "one" SPS configuration (or process) is used, "1 bit" may be transmitted and which SPS configuration (process) is to be used with the "1 bit" may be indicated.

In yet another example, if a (PUCCH-based) ACK/NACK response transmission time regarding "unicast-PDSCH" and a (PUCCH-based) ACK/NACK response transmission time regarding "SL (or UL) grant" (or a (PUCCH-based) "TX indicator" (or "release/activation request") transmission time) overlap (on a time domain, transmission of a relatively low priority level may be omitted according to a pre-defined (or signaled) priority order. Here, for example, transmission of an ACK.NACK response to "SL (or UL)-SPS grant" (or transmission of "TX indicator" (or "release/activation request") or transmission of an ACK/NACK response to "unicast PDSCH") may be set (or signaled) with a relatively low (or high) priority level.

In yet another example, if a transmission time of "unicast-PUSCH" (and/or a transmission time of a (PUCCH-based) ACK/NACK response to "unicast-PDSCH") and a transmission time of a (PUCCH-based) ACK/NACK response to "SL (or UL)-SPS grant" (or a transmission time of (PUCCH-based) "TX indicator" (or "release/activation request")) overlap (on a time domain, it may be set to follow the following (some) rules.

(Example #1) When a (relevant) "TX indicator" (or "release/activation request") is not transmitted in order not to use a pre-set (or signaled) SPS configuration (or process), a "unicast-PUSCH piggyback"-related resource (e.g., a resource in the form of (PUSCH data (mapping)-related) "RM" (or "puncturing)) may be "nulled" (with "on-off keying").

(Example #2) A (resource) location at which an ACK/NACK response to "SL (or UL)-SPS grant" (or "TX indicator" (or "release/activation request)) is piggyback on "unicast-PUSCH" may be set to be a (resource) location at which (legacy A-CSI (Aperiodic CSI) transmission-related)

"CQI/PMI information" (or "RI information" or "ACK/NACK information") is piggyback.

Here, for example, if "unicast-PDSCH"-related "CQI-PMI information" (or "ACK/NACK response" or "RI information") needs to be piggyback together (or simultaneously), it may be set such that "unicast-PDSCH"-related "CQI/PMI information" (or "ACK/NACK response" or "RI information") is first mapped (piggyback) and then "SL (or UL)-SPS grant"-related ACK/NACK response (or "TX indicator" (or "release/activation request")) is mapped (or piggyback) (or "SL (or UL)-SPS grant"-related ACK/NACK response" (or "TX indicator" (or "release/activation request")) is first mapped (piggyback) and then "unicast-PDSCH"-related "CQI/PMI information" (or "ACK/NACK response" or "RI information") is mapped (or piggyback)).

Here, for example, the piggyback operation may be implemented using (PUSCH data (mapping)-related) "RM" (or "puncturing"). Here, in another example, relevant information(s) (e.g., an ACK/NACK response to "SL (or UL)-SPS grant" (and/or an ACK/NACK response to "unicast-PDSCH") and/or "TX indicator" and/or "release/activation request") may be transmitted (or implemented) on a secured piggyback resource with "on-off keying".

In yet another example, In another example, when a plurality of SPS configurations (processes) is set (or signaled), "priority information (or (high priority level) in-use V2X service type information" (e.g., "(non-)periodic V2X message") or "(high priority level) in-use V2X UE type information (e.g., a vehicle UE, and a pedestrian UE)" or ("V2X multicast (or broadcast) data (or PDSCH) TX"-related) "temporary mobile group identity (TMGI) information" (and/or "service ID information" (or "logical ID information on which V2X multicast (or broadcast) data (or PDSCH) is mapped" and/or "cell group (set) ID (or index) information" and/or "MBSFN area (set) ID (or index) information" and/or "newly-defined information (which is linked to TMGI information and/or service ID information (or logical ID information to which V2X multicast (or broadcast) data (or PDSCH) is mapped) and/or cell group (set) ID (or index) information and/or MBSFN area (set) ID (or index) information and/or transmitter (group (or set)) location (or ID) information on where (particular service-related) V2X multicast (or broadcast) data (PDSCH) TX is performed and/or (cell group (set)/MBSFN area (set)) location information on where (particular service-related) V2X multicast (or broadcast) data (or PDSCH) is generated)") may be set (or signaled) on a per SPS configuration (or process) basis.

Here, for example, when different SPS configuration (or process)-related (transmission) resource locations overlap (on a time domain), a V2X UE(s) performs "V2X message TX" through a SPS configuration (or process)-related (transmission) resource having a high priority level ("instantly" or "continuously after a corresponding time" or "during a pre-set (or configured) period after a corresponding time").

Here, for example, "V2X multicast (or broadcast) data (or PDSCH) TX"-related) "TMGI information" (and/or "service ID information" (or "information on logical ID to which V2X multicast (or broadcast) data (or PDSCH) is mapped") and/or "cell group (set) ID (or index) information" and/or "MBSFN area (set) ID (or index) information") set (or signaled) on a per SPS configuration (or process) basis may be directly interpreted as information indicating "transmitter (group (or set)) location ID" where (particular service-related) "V2X multicast (or broadcast) data (or PDSCH) TX" is performed" (and/or "(cell group (set)/ MBSFN area (set)) location" where (particular service-related) "V2X multicast (or broadcast) data (or PDSCH) is generated).

In another example, in order to reduce "interruption time" which occurs during "V2X message TX operation" and/or "V2X message RX operation" due to "handover operation" and/or "cell reselection operation" of a V2X UE, a "serving cell" (or "camping cell") may inform "neighbor (or target) cell"-related "TX pool information" and/or "RX pool information" through pre-defined signaling (e.g., "SIB" or "handover command") (to a corresponding V2X UE).

Here, for example, through the corresponding signaling, (A) whether or not a "neighbor (or target) cell" is implementing V2X communication based on "GNSS SYNCH" (or "eNB SYNCH") and/or (B) "SF (and/or radio frame) (index) difference information" (e.g., "radio frame #0 SF #0" difference information) (or "time (or frequency) SYNCH difference information") between a "neighbor (or target) cell" and a "serving cell" (or "camping cell") may be informed additionally.

In another example, (A) "when switching (from an (RRC) idle mode) to an (RRC) connected mode" and/or (B) "when switching (from PC5 path) to UU path, a V2X UE may report "K" number of "PC5 measurement information(s)" measured in a pre-set (or signaled) window (M_WINDOW) (e.g., it is assumed to be "M_WINDOW" of a "Q (SF)" length) (through pre-defined signaling) (to a "target (or serving) cell").

Here, as an example in which the corresponding rule is applied, if switching "(from the (RRC) idle mode) to the (RRC) connected mode" and/or "(from PC5 path) to the UU path" is attempted at a "SF #N" time and the switching is completed at a "SF #(N+T) time", the V2X UE may report "K" number of "PC5 measurement information(s)" measured in a section from "SF #(N−Q)" to "SF #N" (e.g., "K" number of "PC5 measurement information(s) measured on "SF #(N−Q)", and "SF #(N−Q+CEILING(Q/K))", "SF #(N−Q+2*CEILING(Q/K))", . . . , "SF #(N−Q+(K−1)*CEILING (Q/K))") (or "K" number of "PC5 measurement information(s)" measured in a section from "SF #(N+T−Q)" to "SF #(N+T)" (e.g., "K" number of "PC5 measurement information(s) measured on "SF #(N+T−Q)", "SF #(N+T−Q+CEILING(Q/K))", "SF #(N+T−Q+2*CEILING(Q/K))", . . . , "SF #(N+T−Q+(K−1)*CEILING(Q/K))")) (to the "target (or serving) cell"). Here, for example, when transmitting (or reporting) the corresponding "K" number of "PC5 measurement information(s)", the V2X UE may also report (or transmit) "information on ("K" number of) locations on which PC5 measurement has performed".

Here, for example, if the above proposed rule is applied, the "target (or serving) cell" having received the corresponding information(s) may efficiently identify "PC5 (or MODE 2) link"-related "load (or utilization)" information and determine the need for "path switching" of a particular V2X UE(s) based on the identified information.

Since each of the examples of the aforementioned proposed methods can be also included as one of methods for implementing the present invention, it is apparent that each of the examples can be regarded as a proposed method. In addition, it may be possible to implement each of the proposed methods not only independently but also by combining (or merging) some of the proposed methods. For example, in the present invention, the proposed method based on the 3GPP LTE system has been described for easy description, but the scope of the system to which the proposed method is applied may be extended to other systems than the 3GPP LTE system. As an example, the proposed methods of the present invention may be extended even for D2D communication. Here, as an example, the D2D communication means that a UE communicates directly with another UE using a wireless channel. Here, as an example, the UE refers to a user's terminal, but a network equipment such as a base station may also be regarded as a kind of UE when transmitting/receiving the signal according to a communication scheme between the UEs. In addition, as an example, the proposed methods of the present invention may be limitedly applied on MODE 2 V2X operation (and/or MODE 1 V2X operation).

The above-described example of transmitting feedback information on sidelink (or uplink) SPS information and feedback information on WAN (unicast) PDSCH by means of multiplexing or on the basis of a priority order may be described again with accompanying drawings, as below.

Figure 16:
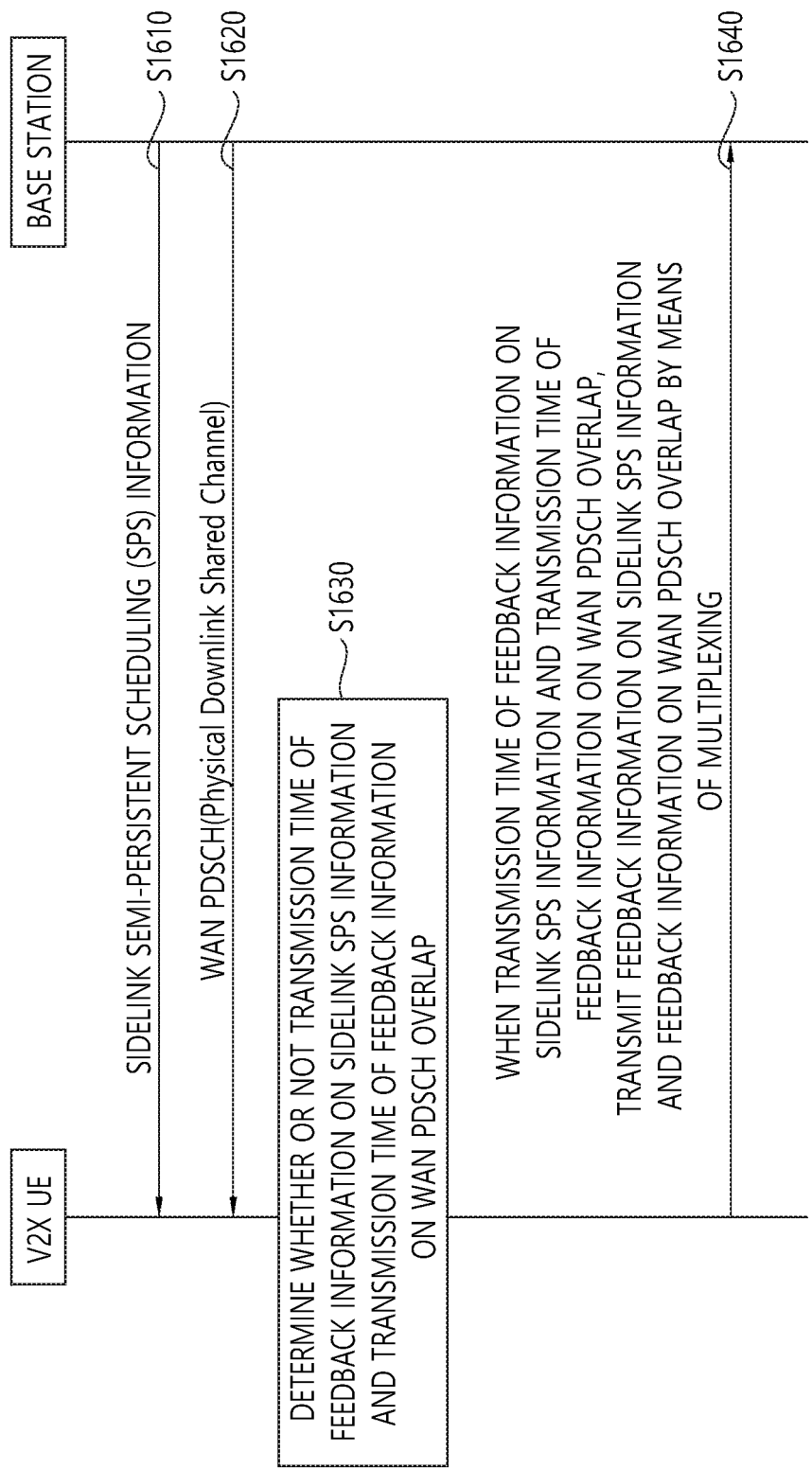
FIG. 16 is a flowchart illustrating a method of transmitting feedback information according to another embodiment of the present invention.

FIG. 16 is a flowchart illustrating a method of transmitting feedback information according to another embodiment of the present invention.

Referring to FIG. 16, a UE may receive sidelink (or uplink) SPS information (S1610).

In addition, the UE may receive a WAN (unicast) PDSCH (S1620).

Here, the UE may receive the sidelink (or uplink) SPS information and the WAN (unicast) PDSCH from a base station, wherein the sidelink (or uplink) SPS information and the WAN (unicast) PDSCH may be received simultaneously, the sidelink (or uplink) SPS information may be received prior to the WAN (unicast) PDSCH, or the WAN (unicast) PDSCH may be received prior to the sidelink (or uplink) SPS information.

Next, the UE may determine whether or not a transmission time of feedback information on the sidelink (or uplink) SPS information and a transmission time of feedback information on the WAN (unicast) PDSCH overlap (S1630). In this case, a specific example of how the UE determines whether or not the transmission time of the feedback information on the sidelink (or uplink) SPS information and the transmission time of the feedback information on the WAN (unicast) PDSCH overlap is the same as described above.

When the transmission time of the feedback information on the sidelink (or uplink) SPS information and the transmission time of the feedback information on the WAN (unicast) PDSCH overlap, the UE may transmit the feedback information on the sidelink (or uplink) SPS information and the feedback information on the WAN (unicast) PDSCH by means of multiplexing (S1640).

In this case, a specific example of how the UE transmits the feedback information on the sidelink (or uplink) SPS information and the feedback information on the WAN (unicast) PDSCH by means of multiplexing is the same as described above.

For example, in the case where a transmission mode supporting up to 2 TB is set, when "unicast grant" and/or "SL(or UL)-SPS grant" is received, two implicit PUCCH resource linked to "lowest CCE index CCE (N_CCE)" of "unicast grant", and one implicit PUCCH resource linked to "SL (or UL)-SPS grant are allocated, and 'HARQ-ACK(0)/(1)/(2)' on a channel selection (CHSel) table are a ACK/NACK response to a first TB of each "unicast-PDSCH", an ACK/NACK response to a second TB, and a ACK/NACK response to SL (or UL)-SPS grant and composed of 3 bits as such. Since details of this example are the same as described above, any redundant description is herein omitted for convenience of explanation.

In the case where a CHSel in which a bundling window size (M) is "A" (A≤3) is set (in a TDD system), (A) if the last received or greatest "DL DAI value" is equal to or smaller than "A", a CHSel table corresponding to "M=A" (e.g., a method for allocating a PUCCH resource and configuring HARQ-ACK(i), the method proposed in the present disclosure) may be applied (identically), and/or, if the last received or greatest "DL DAI value" exceeds "A", that is, if the last received or greatest "DL DAI value" is "A+1", a CHSel table corresponding to "M=A+1" (e.g., a method for allocating a PUCCH resource and configuring HARQ-ACK (i), the method proposed in the present disclosure) may be applied (identically). In addition, in the case where a CHSel in which a bundling window size (M) is "4" is set (in a TDD system), (A) if the last received or greatest "DL DAI value" is equal to or smaller than "4", a CHSel table corresponding to "M=4" may be applied, and/or, (B) if the last received or greatest "DL DAI value" exceeds "4", that is, if the last received or greatest "DL DAI value" is "5", an ACK/NACK response may be transmitted through a pre-defined (or signaled) (relatively large payload-sized) PUCCH format (e.g., PUCCH format 3 (PF 3). Here, for example, it may be interpreted such that, in the case of (A), "TPC field" of every "DL grant" indicates actual TPC information, whereas, in the case of (B), only "TPC field" corresponding to "(first) DL DAI=1" indicates actual TPC information and remaining "TPC field" corresponding to "DL DAI>1" indicates "PF 3"-related "ARI information". Since details of this example are the same as described above, any redundant description is herein omitted for convenience of explanation.

For example, in the need of multiplexing (or simultaneously transmitting) an ACK/NACK response to "unicast-PDSCH" and an ACK/NACK response to "SL (or UL)-SPS grant" (or "TX indicator" or "release/activation request"), it may be set such that transmission (of ACK/NACK responses) is always performed through a pre-defined (or signaled) (relatively large payload-sized) PUCCH format (e.g., PUCCH format 3 (PF 3)). Since details of this example are the same as described above, any redundant description is herein omitted for convenience of explanation.

In the need of simultaneously transmitting (or multiplexing) an ACK/NACK response to "unicast-PDSCH" and an ACK/NACK response to "SL (or UL)-SPS grant" (or "TX indicator" or "release/activation request"), (pre-set) "(spatial) bundling operation" may be applied between the ACK/NACK response to "unicast-PDSCH" and the ACK/NACK response to "SL (or UL)-SPS grant" (or "TX indicator" or "release/activation request"). Since details of this example are the same as described above, any redundant description is herein omitted for convenience of explanation.

Figure 17:
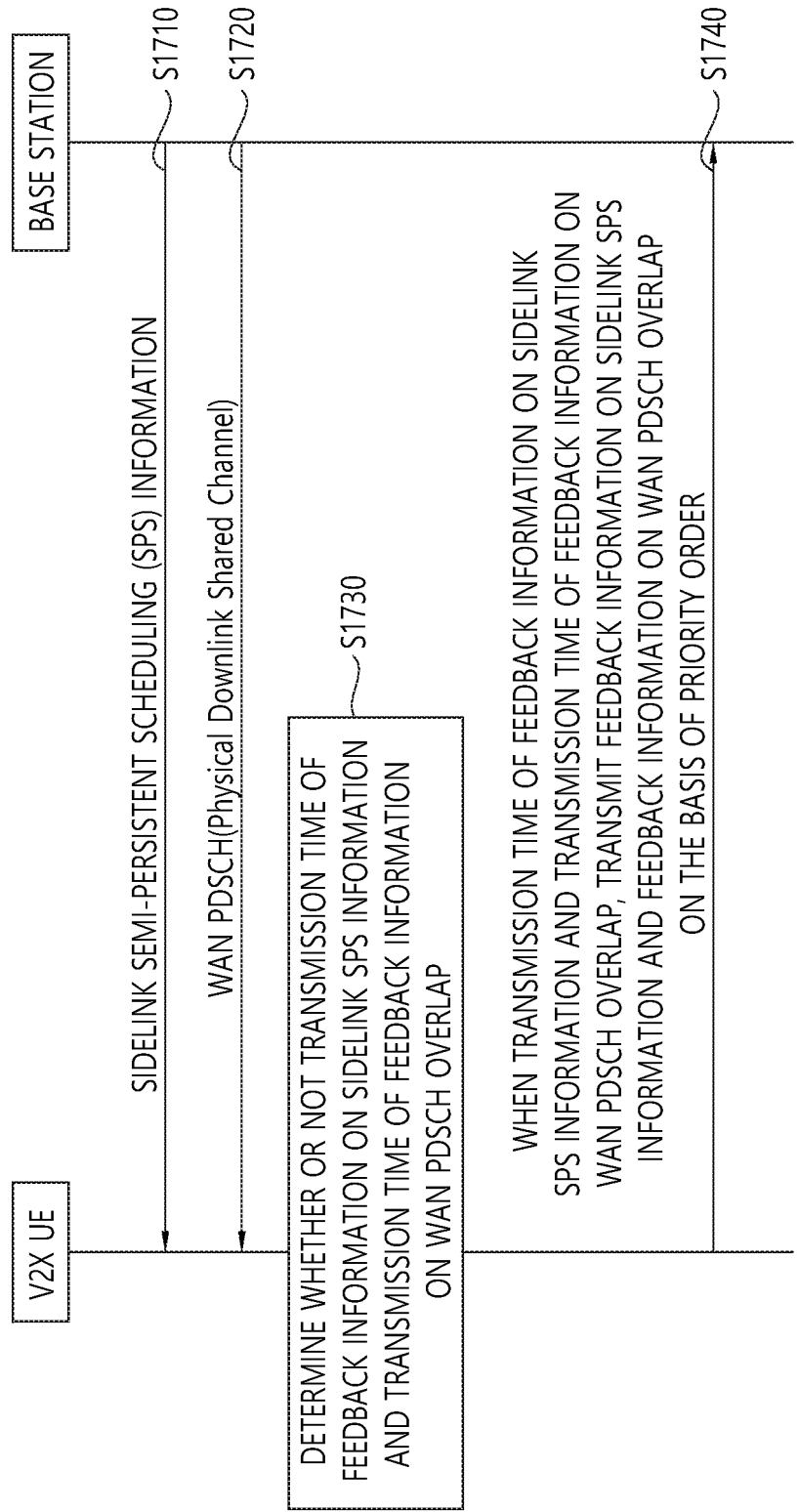
FIG. 17 is a flowchart illustrating a method of transmitting feedback information according to yet another embodiment of the present invention.

FIG. 17 is a flowchart illustrating a method of transmitting feedback information according to yet another embodiment of the present invention.

Referring to FIG. 17, a UE may receive sidelink (or uplink) SPS information (S1710).

In addition, the UE may receive a WAN (unicast) PDSCH (S1720).

Here, the UE may receive the sidelink (or uplink) SPS information and the WAN (unicast) PDSCH from a base station, wherein the sidelink (or uplink) SPS information and the WAN (unicast) PDSCH may be received simultaneously, the sidelink (or uplink) SPS information may be received prior to the WAN (unicast) PDSCH, or the WAN (unicast) PDSCH may be received prior to the sidelink (or uplink) SPS information.

Next, the UE may determine whether or not a transmission time of feedback information on the sidelink (or uplink) SPS information and a transmission time of feedback information on the WAN (unicast) PDSCH overlap (S1730). In this case, a specific example of how the UE determines whether or not the transmission time of the feedback information on the sidelink (or uplink) SPS information and the transmission time of the feedback information on the WAN (unicast) PDSCH overlap is the same as described above.

When the transmission time of the feedback information on the sidelink (or uplink) SPS information and the transmission time of the feedback information on the WAN (unicast) PDSCH overlap, the UE may transmit the feedback information on the sidelink (or uplink) SPS information and the feedback information on the WAN (unicast) PDSCH on the basis of a priority order (S1740).

In this case, a specific example of how the UE transmits the feedback information on the sidelink (or uplink) SPS information and the feedback information on the WAN (unicast) PDSCH by means of multiplexing is the same as described above.

For example, as described above, if a UE receives "unicast-PDSCH" and "SL (or UL)-SPS grant" at the same time, it may be set such that the ACK/NACK response to "unicast-PDSCH" is (first) transmitted (e.g., the ACK/NACK response to "SL (or UL)-SPS grant" is omitted) (or the ACK/NACK response to "SL (or UL)-SPS grant" is (first) transmitted (e.g., the ACK/NACK response to "unicast-PDSCH" is omitted)). Since details of this example are the same as described above, any redundant description is herein omitted for convenience of explanation.

For example, as described above, if a (PUCCH-based) ACK/NACK response transmission time regarding "unicast-PDSCH" and a (PUCCH-based) ACK/NACK response transmission time regarding "SL (or UL) grant" (or a (PUCCH-based) "TX indicator" (or "release/activation request") transmission time) overlap (on a time domain, transmission of a relatively low priority level may be omitted according to a pre-defined (or signaled) priority order. Since details of this example are the same as described above, any redundant description is herein omitted for convenience of explanation.

For example, as described above, if a transmission time of "unicast-PUSCH" (and/or a transmission time of a (PUCCH-based) ACK/NACK response to "unicast-PDSCH") and a transmission time of a (PUCCH-based) ACK/NACK response to "SL (or UL)-SPS grant" (or a transmission time of (PUCCH-based) "TX indicator" (or "release/activation request")) overlap (on a time domain, it may be set to follow the following (some) rules. For example, when a (relevant) "TX indicator" (or "release/activation request") is not transmitted in order not to use a pre-set (or signaled) SPS configuration (or process), a "unicast-PUSCH piggyback"-related resource (e.g., a resource in the form of (PUSCH data (mapping)-related) "RM" (or "puncturing)) may be "nulled". For example, a (resource) location at which an ACK/NACK response to "SL (or UL)-SPS grant" (or "TX indicator" (or "release/activation request)) is piggyback on "unicast-PUSCH" may be set to be a (resource) location at which (legacy A-CSI (Aperiodic CSI) transmission-related) "CQI/PMI information" (or "RI information" or "ACK/NACK information") is piggyback. Since details of this example are the same as described above, any redundant description is herein omitted for convenience of explanation.

For example, as described above, if "unicast-PDSCH"-related "CQI-PMI information" (or "ACK/NACK response" or "RI information") needs to be piggyback together (or simultaneously), it may be set such that "unicast-PDSCH"-related "CQI/PMI information" (or "ACK/NACK response" or "RI information") is first mapped (piggyback) and then "SL (or UL)-SPS grant"-related ACK/NACK response (or "TX indicator" (or "release/activation request")) is mapped (or piggyback) (or "SL (or UL)-SPS grant"-related ACK/NACK response" (or "TX indicator" (or "release/activation request")) is first mapped (piggyback) and then "unicast-PDSCH"-related "CQI/PMI information" (or "ACK/NACK response" or "RI information") is mapped (or piggyback)). Since details of this example are the same as described above, any redundant description is herein omitted for convenience of explanation.

For example, as described above, as another example, when a plurality of SPS configuration (or processes) is set (or signaled), "priority information" (or "(high priority level) in-use V2X service type information" (e.g., "(non-)periodic V2X message") or "(high priority level) in-use V2X UE type information (e.g., a vehicle UE, and a pedestrian UE)" or "TMGI information") may be also set (or signaled) on a per SPS configuration (or process) basis. Since details of this example are the same as described above, any redundant description is herein omitted for convenience of explanation.

Figure 18:
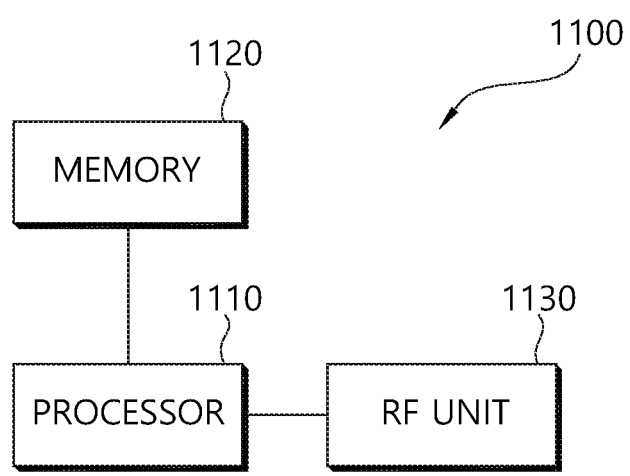
FIG. 18 is a block diagram illustrating a UE in which the embodiment of the present invention is implemented.

FIG. 18 is a block diagram illustrating a UE in which the embodiment of the present invention is implemented.

Referring to FIG. 18, a UE 1100 includes a processor 1110, a memory 1120, and a Radio Frequency (RF) unit 1130.

According to an embodiment, the processor 1110 may implement a function, a process, and/or a method which are proposed. For example, the processor 1110 may be set to determine whether or not a transmission time of feedback information on sidelink (or uplink) SPS and a transmission time of feedback information on a WAN (unicast) PDSCH overlap. When the transmission time of the feedback information on the sidelink (or uplink) SPS and the transmission time of the feedback information on the WAN (unicast) PDSCH overlap, the processor 1110 may be set to transmit the feedback information on the sidelink (or uplink) SPS and the feedback information on the WAN (unicast) PDSCH by means of multiplexing or on the basis of a priority order.

The RF unit 1130 is connected with the processor 1110 to transmit and receive a radio signal.

The processor may include an application-specific integrated circuit (ASIC), another chipset, a logic circuit and/or a data processing apparatus. The memory may include a read-only memory (ROM), a random access memory (RAM), a flash memory, a memory card, a storage medium, and/or other storage devices. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

What is claimed is:

1. A method for Vehicle-To-Everything (V2X) communication in a wireless communication system, the method performed by a user equipment (UE) and comprising:
   determining whether or not a first transmission time of first feedback information on sidelink Semi Persistent Scheduling (SPS) information and a second transmission time of second feedback information on a Wide Area Network (WAN) Physical Downlink Shared Channel (PDSCH) overlap; and transmitting the first feedback information on the sidelink SPS information and the second feedback information based on the determination, wherein, based on the first transmission time and the second transmission time overlapping, the first feedback information and the second feedback information are transmitted via multiplexing and based on a priority order, and wherein, based on the first feedback information and the second feedback information being transmitted via the multiplexing, the first feedback information and the second feedback information are multiplexed based on an acknowledgement (ACK)/negative acknowledgement (NACK) channel selection table.

2. The method of claim 1, wherein the first feedback information is ACK/NACK information on a sidelink SPS message, or a transmission indicator indicative of an intention to transmit data.

3. The method of claim 1, wherein the second feedback information is ACK/NACK information on the WAN PDSCH.

4. The method of claim 1, wherein, based on the first feedback information and the second feedback information being transmitted via the multiplexing, an amount of the second feedback information is transmitted compared to an amount of the first feedback information.

5. The method of claim 4, wherein one PUCCH resource of the first feedback information is allocated, and two PUCCH resources of the second feedback information are allocated.

6. The method of claim 1,
wherein the first feedback information and the second feedback information are prioritized, and
wherein, based on the first feedback information and the second feedback information being transmitted based on the priority order, transmission of feedback information of a relatively low priority level is omitted.

7. The method of claim 6, wherein, based on a priority level for the first feedback information being lower than a priority level for the second feedback information, transmission of the first feedback information is omitted.

8. The method of claim 6, wherein, based on a priority level for the second feedback information being lower than a priority level for the first feedback information, transmission of the second feedback information is omitted.

9. A user equipment (UE) comprising:
a Radio Frequency (RF) unit including a transceiver configured to transmit and receive a radio signal; and
a processor configured to operate in conjunction with the RF unit, wherein the processor is further configured:
determine whether or not a first transmission time of first feedback information on sidelink Semi Persistent Scheduling (SPS) information and a second transmission time of second feedback information on a Wide Area Network (WAN) Physical Downlink Shared Channel (PDSCH) overlap; and
transmit the first feedback information and the second feedback information based on the determination,
wherein, based on the first transmission time and the second transmission time overlapping, the first feedback information and the second feedback information are transmitted via multiplexing and based on a priority order, and
wherein, based on the first feedback information and the second feedback information being transmitted via the multiplexing, the first feedback information and the second feedback information are multiplexed based on an acknowledgement (ACK)/negative acknowledgement KNACK) channel selection table.

* * * * *